United States Patent
Yamamoto et al.

(10) Patent No.: US 7,250,121 B2
(45) Date of Patent: Jul. 31, 2007

(54) NON-LINEAR OPTICAL DEVICE MATERIAL COMPOSITION

(75) Inventors: Michiharu Yamamoto, Carlsbad, CA (US); Joshua Tillema, Vista, CA (US); Mohanalingam Kathaperumal, Oceanside, CA (US)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 11/314,927

(22) Filed: Dec. 20, 2005

(65) Prior Publication Data

US 2006/0097234 A1    May 11, 2006

Related U.S. Application Data

(63) Continuation-in-part of application No. 10/844,859, filed on May 13, 2004.

(51) Int. Cl.
*G02B 5/23* (2006.01)
*F21V 9/00* (2006.01)
*C08L 35/00* (2006.01)
*C08L 39/04* (2006.01)

(52) U.S. Cl. ............ 252/586; 252/582; 525/205; 525/282

(58) Field of Classification Search ............... 252/586
See application file for complete search history.

(56) References Cited

U.S. PATENT DOCUMENTS

| | | | |
|---|---|---|---|
| 2,774,697 | A | 12/1956 | Koblitz |
| 5,064,264 | A | 11/1991 | Ducharme et al. |
| 5,426,164 | A | 6/1995 | Babb et al. |
| 5,763,548 | A | 6/1998 | Matyjaszewski et al. |
| 5,807,937 | A | 9/1998 | Matyjaszewski et al. |
| 6,067,186 | A | 5/2000 | Dalton et al. |
| 6,090,332 | A | 7/2000 | Marder et al. |
| 6,267,913 | B1 | 7/2001 | Marder et al. |
| 6,348,992 | B1 | 2/2002 | Zhang et al. |
| 6,361,717 | B1 | 3/2002 | Dalton et al. |
| 6,534,198 | B1 | 3/2003 | Ueno et al. |
| 6,555,027 | B2 | 4/2003 | Wang et al. |
| 6,610,809 | B1 | 8/2003 | Yamamoto |
| 6,616,865 | B1 | 9/2003 | Zhang et al. |
| 6,653,421 | B1 | 11/2003 | Yamamoto |
| 6,716,995 | B2 | 4/2004 | Huang et al. |
| 2002/0027220 | A1 | 3/2002 | Wang et al. |
| 2002/0084446 | A1 | 7/2002 | Dalton et al. |
| 2004/0266954 | A1 | 12/2004 | Jen et al. |

FOREIGN PATENT DOCUMENTS

| | | |
|---|---|---|
| JP | 01266118 A | 10/1989 |
| JP | 10-333195 | 12/1998 |
| JP | 2001-115124 | 4/2001 |
| JP | 07-318992 | 12/2005 |
| WO | WO 01/53746 | 7/2001 |
| WO | WO 01/53746 A1 | 7/2001 |

OTHER PUBLICATIONS

Yi-Wang Chen et al., "Photorefractive Effect in a New Composite Based on Bifunctional Host Polymer," *Journal of Applied Polymer Science*, 77:189-194 (2000).

Michiharu Yamamoto, et al., The Preparation and Thermal Dimerization Study of a Trifluorovinyl-Containing Imide. Application to the Synthesis of a Trifluorovinyl-Containg Polymide Precursor, *Macromol. Symp.* 82, 124-141 (1994).

Ando, Tsuyoshi et al., "Living Radical Polymerization of Methyl Methacrylate with Ruthenium Complex: Formation of Polymers with Controlled Molecular Weights and Very Narrow Distributions," *Macromolecules*, 29:1070-1072 (1996).

Diaz-Garcia, M.A. et al., Photorefractive Properties of Poly(*N*-vinyl carbazole)-Based Composites for High-Speed Applications, *Chem. Mater.*, vol. 11, No. 7: 1784-1791 (1999).

Hendrickx, Eric et al., "Photoconductive properties of PVK-based photorefractive polymer composites doped with fluorinated styrene chromophores," *J. Mater. Chem.*, 9:2251-2258 (1999).

In Kyu Moon et al., "Highly Efficient Photoretractive System Based on Carbazole-Substituted Poly (Siloxane)," *Mol. Cryst. Liq. Cryst.*, 349:43-46 (2000).

Kawakami, T. et al., "Photoinduced refractive index change in a photoconductive electro-optic polymer," *Appl. Phys. Lett.*, 62 (18), May 3, 1993, pp. 2167-2169.

Matyjasewski, K. et al., "Controlled/living radical polymerization. Halogen atom transfer radical polymerization promoted by a Cu(I)/Cu(II) redox process", *Macromolecules*, 28, 7901 (1995).

Meerholz, K. et al., "A photorefractive polymer with high optical gain and diffraction efficiency near 100%," *Nature*, 371: 497-500 (1994).

Patten, Timothy E. et al., "Radical Polymerization yielding Polymers with MwMn-1.05 by Homogeneous Atom Transfer Radical Polymerization," *Polymer Preprints*, 37:575-578 (1996).

(Continued)

*Primary Examiner*—Randy Gulakowski
*Assistant Examiner*—Tim Kugel
(74) *Attorney, Agent, or Firm*—Knobbe Martens Olson & Bear LLP

(57) ABSTRACT

An optical device composition of the present invention includes a trifluorovinyl group containing polyimide that is crosslinkable and thermally stable after crosslinking. The invention relates to a polyimide composition which provides either passive or active wave-guide optical capabilities. More particularly since the composition comprises a chromophore which shows non-linear optical ability, the composition can be used for an active wave guide material, such as modulator or switching device compositions. Furthermore, the composition may include a trifluorovinyl containing chromophore and polyimide which comprises non-linear optical ability in the matrix polymer system.

14 Claims, 1 Drawing Sheet

OTHER PUBLICATIONS

Peng Zhou et al., "Synthesis of $C_{60}$-End-Bonded Polymers with Designed Molecular Weights and narrow Molecular Weight Distributions via Atom Transfer Radical Polymerization," *Macromolecules*, 2000, 33, 1948-1954, 2000 American Chemical Society Published on web Feb. 25, 2000.

Sato, Hisaya et al., Synthesis and Characterization of Photorefractive Polymeric Material with High Change Mobility, *Technical Report of IEICB* (10005-10), pp. 43-45, date: 1995.

Ueda, Jiro et al., "Multifunctional Initiators for the Ruthenium-Mediated Living Radical Polymerization of Methyl Methacrylate: Di-and Trifunctional Dichloroacetates for Synthesis of Multiarmed Polymers," *Macromolecules*, vol. 31, No. 3, 557-562 (1998).

Tamura, K. et al., "New polymeric material containing the tricyanovinylcarbazole group for photorefractive applications," *Appl. Phys. Lett.*, 60(15), Apr. 13, 1992, pp. 1803-1805.

Twleg, R. et al., "Recent Progress on Photorefractive Chromophores and Polymers," IMB Research Division Almaden Research Laboratory, San Jose, CA 95120, pp. 164-165, no date.

Van Steenwinckel, David et al., Fully Functionalized Photorefractive Polymethacrylates with net Gain at 780 nm, *Macromolecules*, 33:4074-4079 (2000).

Wang, Jin-Shan et al., "Controlled/'Living' Radical Polymerization. Halogen Atom Transfer Radical Polymerization Promoted by a Cu(I)/Cu(II) Redox Process," *Macromolecules*, vol. 28, No. 23, 1995, pp. 7901-7910.

Woong Sang Jahng et al., "Synthesis and Characterization of Hole=transport Materials in Polysiloxane," Molecular Crystals and Liquid Crystals Gordon & Breach Switzerland, 377:329-332 (2002), XP008039101, ISSN: 1058-725X.

Wright, Daniel et al., "Photorefractive Properties of Poly(siloxane)-Triarylamine-Based Composites for High-Speed Applications," *J. Phys. Chem. B.*, vol. 107, No. 20, 4732-4737 (2003). XP002306198.

Yamomoto, M. et al., "The Preparation and Thermal Dimerization Study of a Trifluorovinyl-containing Imide, Application to the Synthesis of a Trifluorovinyl-Containing Polyimide Precursor," *Macromol. Symp.* 82:125-141 (1994).

NON-LINEAR OPTICAL DEVICE MATERIAL COMPOSITION

CROSS-REFERENCE TO RELATED APPLICATIONS

This application is a continuation-in-part of U.S. patent application Ser. No. 10/844,859, filed May 13, 2004, which is hereby incorporated by reference in its entirety.

BACKGROUND OF THE INVENTION

1. Field of the Invention

The invention relates to passive and active optical device materials. More particularly, the invention relates to polyimide compositions which provide either passive or active wave-guide optical capabilities.

2. Description of the Related Art

Either passive or active wave-guide optical device materials are key components for a wide range of cutting edge optical telecommunication devices. Also, signal processing by optical technology in broadband society will be a key issue to control large amounts of information accurately with short response time. Particularly, there is a growing interest in using active nonlinear optical devices for signal modulation and switching. Additionally, passive optical wave-guide device materials are also crucial components in order to lead optical signals into the active nonlinear optical devices. Organic active non-linear optics materials have several advantages, i.e. large NLO effect, nano- to pico-second response time, and structural design flexibility. Also, these polymer-based materials show better processing ability, mechanical stableness, and cost effectiveness as compared to inorganic crystal materials, such as $LiNbO_3$ and $BaTiO_3$. Also, in terms of response time and modulation speed, polymer-based materials have more advantages than inorganic materials, because usually organic polymer-based materials have a lower dielectric constant that leads to faster modulation and switching properties. Also, a passive material is a fundamental material for active optical devices, because this material can be used for a device portion in which optical signals can travel between devices and optical fibers.

Critical requirements for polymer-based optical device materials are high stability (thermal, chemical, photochemical, and mechanical) and low optical loss along with high electro-optic performances.

For achieving high thermal stabilities, high Tg polymer matrix systems are desirable, such as those using polyimide, polyurethane, and polyamide. Particularly, polyimides show excellent thermal stability and are used for various engineering plastics materials. Since polyimide is very stable in terms of chemical, mechanical and temperature properties and possesses excellent optical properties, its major interesting properties for passive or active optical devices include the following:

a. Chemical Stabilities

It is compatible with most microelectronics processes including photolithographic, Reactive Ion Etching (RIE), plasma and sputtering deposition, etc. It has reasonable solvent solubility, and therefore, it can be easily coated as thin film using variety of techniques (spin or spray coatings) before crosslinking.

b. Physical and Thermal Stabilities

Polyimide has a thermal expansion coefficient compatible with silicon, which will be very useful property for integration polymer optical devices with silicon-based microelectronic devices. It is also chemically stable at temperatures as high as 300° C. As recently reported, polyimide type material showed very good thermal stabilities, and no critical deterioration of second-order nonlinear properties was observed at more than 3000 hrs even at 100° C. in the air.

c. Optical Properties

Polyimide has high optical transmission over a wide range from visible to telecommunication wavelengths. In optical wave-guide shape, the transmission loss is reported as lower as 0.1 dB/cm at 1.3 µm.

d. ElectroOptics Properties

When polyimide is loaded with chromophore, it becomes nonlinear polyimide material, and it could have relatively high nonlinearity. A high nonlinear electro-optic coefficient of as high as 35 pm/V has been reported, since matrix polymer and NLO chromophore are usually compatible for a long period of time.

Furthermore, particularly fluorinated polymer have unique features, such as low dielectric constants, low optical loss, and easier workability because of good solvent solubility. Usually, fluorinated polyimide before crosslinking has very good solvent solubility so that it is easily workable for spin-coating processing in fabrication of optical devices.

Also, it is generally known that the more the fluorine atom weight content ratio, the lower the dielectric constant becomes. Usually, lower dielectric constant material can make optical signal traveling speed or modulation speed faster because of less π-electron interaction.

Generally, fluorinated polymer can reduce optical loss of signals. Optical propagation loss includes absorption and scattering losses. Material properties, namely interband electronic absorption of the chromophore and C—H vibration absorption of chromophore and polymer host, contribute to the absorption loss in the polymers. The scattering loss is mainly attributed to dust particles and micro domains introduced during the processing (spin coating, poling, photolithographic processing, and etc.). Therefore, advantages of the fluorinated polymer can contribute mainly to lower the absorption losses. Usually, the wavelengths which are generally used in telecommunication are between 1.3 and 1.5 µm. Thus, if polymer-based materials contain a plenty of C—H bondage, $NH_2$, NH, or OH functional groups in their structures, these moiety vibration absorption in double-frequency area is significant and can give big influence on material absorption.

As reported earlier, polyimide type material showed very good thermal stabilities and no critical deterioration. Sometimes, the second-order nonlinear properties were observed at more than 3000 hrs even at 100° C. in the air. Thus, a combination of polyimide and fluorinated polymer resulted in satisfactory improvement as optical device material. However, sometimes incorporation of chromophore into fluorinated polyimide resulted in lower thermal stabilities. Thus, in order to improve the thermal stabilities, a concept of crosslinking seems to be a practical method to obtain higher and better thermal stableness after crosslinking.

In order to obtain good electrical optical performances, chromophores which are incorporated into host matrix materials are desired for orientation toward the same direction. The chromophores can be orientated to the same direction by polling process or some other proper processes. However, over the time, the direction of chromophores could eventually be disorientated. Particularly, this tendency is observed in the case of low Tg materials. In order to overcome this disadvantage, the concept of crosslinking is very helpful and practical method to obtain higher and better thermal stableness.

As typical crosslinking moieties, epoxy/isocyanate moieties and hydroxyl/amino groups are available. However, after crosslinking, these kinds of moieties result in existence of NH— or —OH group, which contributes to higher absorption in a 1.3 to 1.5 μm wavelength region. On the other hand, as examples of crosslinking moieties which do not result in undesired NH— or —OH group, tri-cyclization of acetylene group, cyanurate ring formation from cynate ester derivatives, difluoro bismaleimide, or trifluorovinyl groups can be crosslinking moiety candidates. However, from standpoints of crosslinking temperature and easiness of synthesis, trifluorovinyl group seems to be the most practical crosslinking moiety, because this group can crosslink around 160-200° C. which are sufficiently lower than the decomposition temperature of thermally unstable other components, such as chromophore.

SUMMARY OF THE INVENTION

An object of the present invention is to provide passive and active optical device materials. More particularly, the invention relates to a polyimide composition that provides either passive or active wave-guide optical capabilities.

Embodiments of the invention are non-linear optical device compositions comprising polyimide and a non-linear optical chromophore, wherein the polyimide comprises a unit represented by the formula (i):

Formula (i)

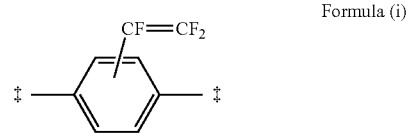

The symbol "‡" in the chemical structure herein specifies an atom of attachment to another chemical group. In the present invention, it is preferable that the polyimide comprises a unit represented by the formula (ii):

Formula (ii)

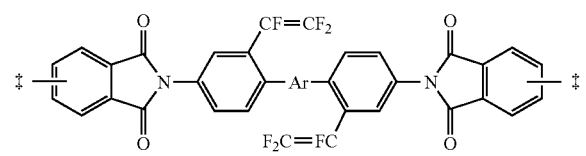

wherein Ar is a bivalent group comprising an aromatic group and the symbol "‡" in the chemical structure herein specifies an atom of attachment to another chemical group.

Further, in the present invention, it is preferable that the Ar contains —C(CF$_3$)$_2$— group in the polyimide.

Furthermore, it is preferable that the non-linear optical chromophore comprises a unit represented by the formula (i):

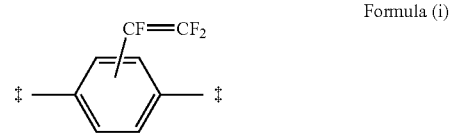

Formula (i)

The symbol "‡" in the chemical structure herein specifies an atom of attachment to another chemical group. The composition comprises trifluorovinyl containing polyimide and a chromophore that provides non linear optics ability. The composition differs from optical device compositions previously known in the art in several points.

In preferred embodiments, the non-linear optical chromophore includes a compound represented by the formula (x):

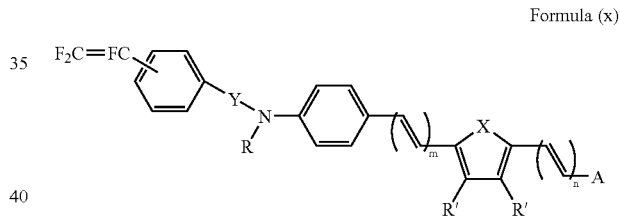

Formula (x)

wherein X is oxygen or sulfur; Y is a bivalent group; A is an acceptor; R and R' are each independently selected from the group consisting of a hydrogen atom, a linear alkyl group with up to 10 carbons, and a branched alkyl group with up to 10 atoms; m and n are each independently an integer of from 1 to 5.

In further preferred embodiments, the non-linear optical chromophore includes a compound represented by the formula (xi):

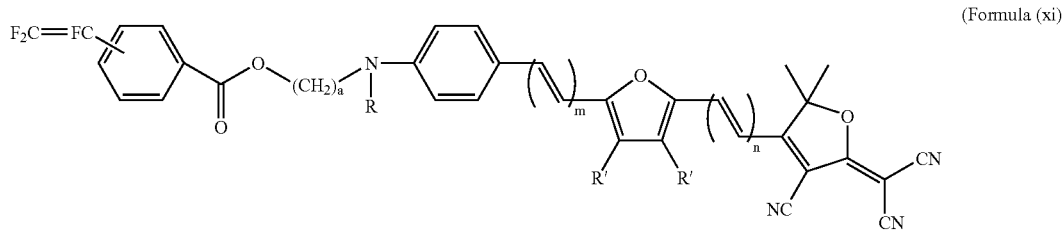

(Formula (xi))

wherein R, R', m and n are the same meaning as in the formula (x); a is an integer of from 1 to 8, and is preferably an integer from 3 to 6.

In furthermore preferred embodiments, non-linear optical chromophore includes a compound represented by the following structure.

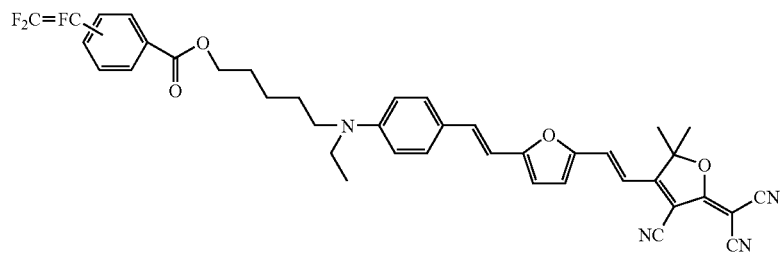

DETAILED DESCRIPTION OF THE PREFERRED EMBODIMENT

Figure 1:
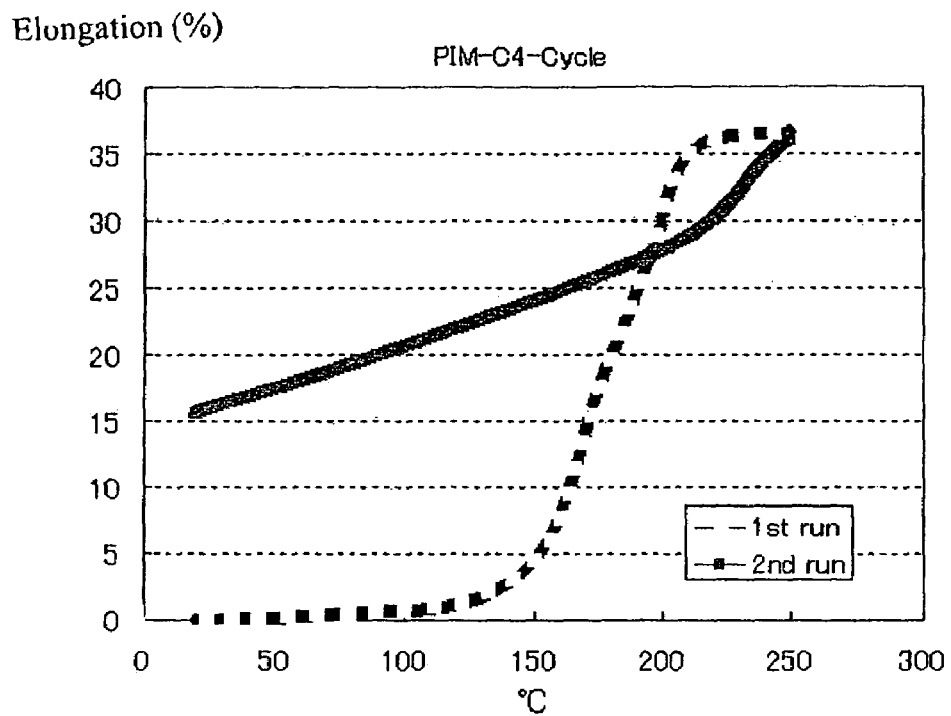
FIG. 1 shows a change of glass transition temperature after heating up and crosslinking.

The invention is a composition for passive and active optical device materials. A preferable embodiment of the composition comprises at least a polyimide matrix that contains trifluorovinyl groups which provides thermally crosslinking ability. Also, a preferable embodiment of the composition comprises a non-linear optics chromophore that provides an active wave-guide ability. Furthermore, the chromophore may contain a trifluorovinyl group which provides thermally crosslinking ability.

The novel trifluorovinyl containing imide derivative, which was reported in a prior art by the inventor (M. Yamamoto, D. C. Swenson and D. J. Burton, Macromol. Symp. Vol. 82, 125-141 (1994)) and can be synthesized by several steps, can form bimolecular cyclic compounds by heating. According to model compound experiment, trifluorovinyl containing imide compounds can convert into two cyclic compounds. Usually, this thermal dimerization reaction can proceed even in presence of air and even corporate in polymer forms.

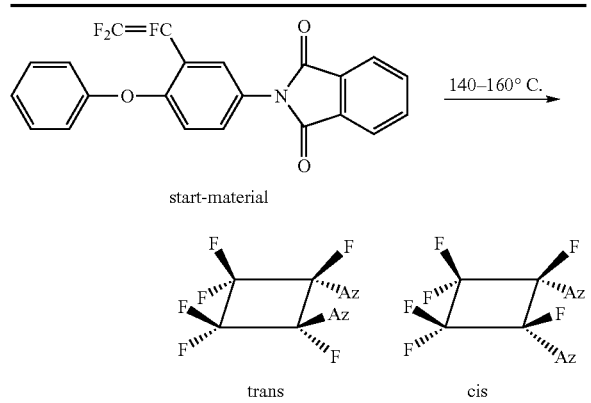

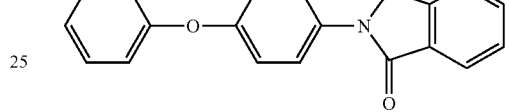

| | start-material | yield | |
|---|---|---|---|
| | (unreacted) | trans | cis |
| 160° C. | 27 | 64 | 5 |
| 140° C. | 59 | 29 | 12 |

Based on the concept, this trifluorovinyl groups can be incorporated into fluoro containing polyimide as side-chain, as depicted in the below general formula (ii).

formula (ii)

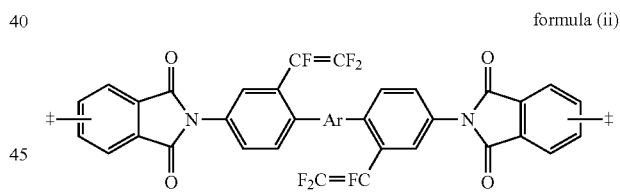

The polymer can be thermal curable by two functional group couplings of trifluorovinyl groups and converted into thermal setting polymer. As far as the inventor knows, this kind of trifluorovinyl containing polyimides have not been known, although Alex Jen et al. reported trifluorovinyl ether containing type dendrimer chromophore and utilize for optical device materials.

The proposed trifluorovinyl containing polyimide is expected to have better at least thermal properties, because matrix polymer can be crosslinked and chromophore can be entrapped as an orientation form inside polymer network. Also, at the same time, the polyimide contains relatively large amount of fluorine atom that may lead to low optical loss for IR region signals.

Regarding another component of optical device, such as chromophore part, if trifluorovinyl containing chromophore is also used, chromophore moiety can be incorporated into not only matrix polymer and expected better stability. The trifluorovinyl containing matrix polymer and chromophore system can give unique properties and very good thermal properties.

Optionally, the matrix polyimide may also include other non-linear optical moiety as desired, as co-polymer components. In this case, both of the crosslinking moiety and non-linear optical components may be incorporated as functional groups into the polyimide structure, typically as side groups.

If this group is to be attached to the polymer matrix as a side chain, then the group may be capable of incorporation into a monomer that can be polymerized to form the polymer matrix of the composition. Since the polyimide can be prepared from both anhydride and diamine monomers, the crosslinking moiety may be incorporated into at least an anhydride monomer or diamine monomer.

The polyimide synthesis from the corresponding dianhydride and diamine takes two steps, as illustrated in the below. In the first step, a polycondensation reaction between diamine and dianhydride takes place and leads to a polymer chain, which is called as a polyamic acid. Then, in the second step, dehydration and ring closure reactions are carried out and resulted in the corresponding polyimide.

This trifluorovinyl containing polyimide preferably can be prepared at least either from the trifluorovinyl dianhydride or diamine.

A trifluorovinyl group that is unique point in this invention may be incorporated at least in the dianhydride or diamine monomers. A structure of a trifluorovinyl group containing dianhydride is not limited. For example, a trifluorovinyl group containing dianhydride is one represented in formula (v):

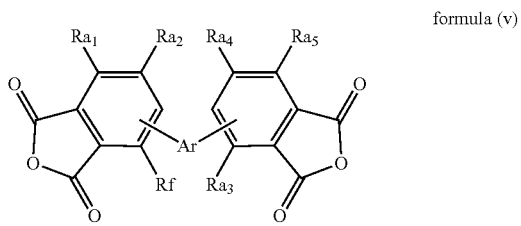

formula (v)

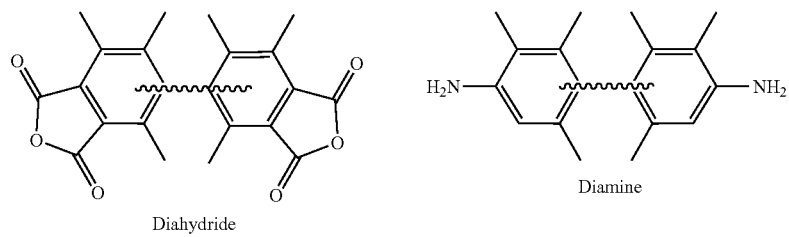

Diahydride

Diamine

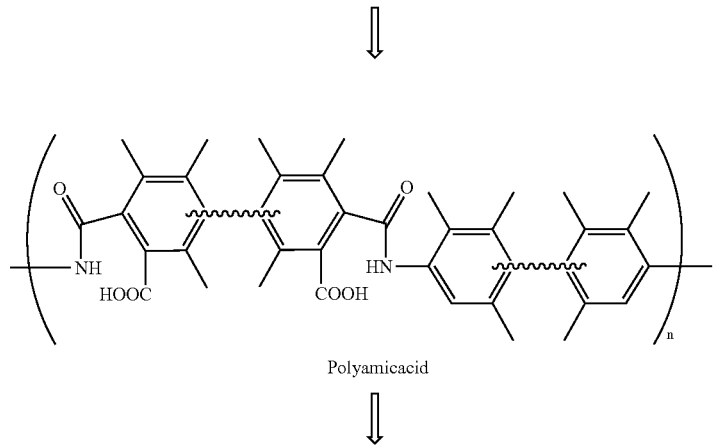

Polyamicacid

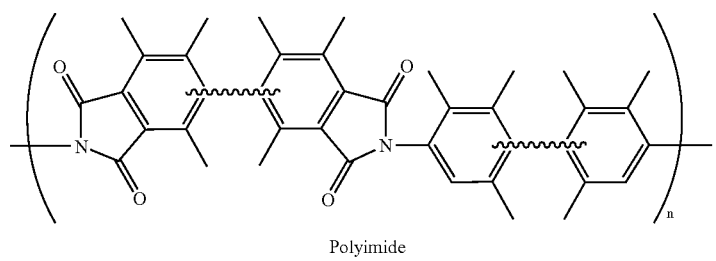

Polyimide

-continued

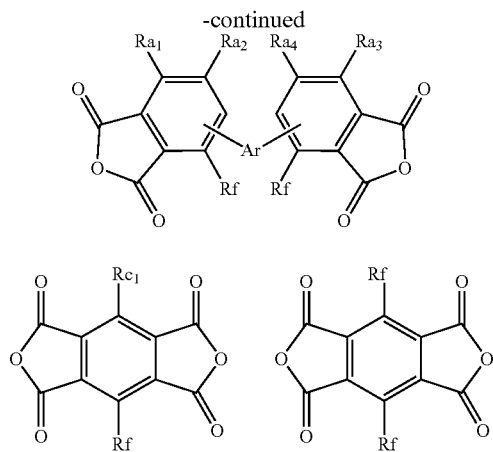

wherein Rf is a trifluorovinyl group, Ar is selected from the group consisting of ether, a linear alkyl group with up to 10 carbons, a branched alkyl group with up to 10 carbons, and an aromatic group with up to 10 carbons; Z represents an oxygen, sulfur, sulfonyl, or alkylene group, with or without fluorine or a hetero atom, such as oxygen or sulfur, and preferably Z is an oxygen, —C(CF$_3$)$_2$—, or alkylene group represented by (CH$_2$)p; where p is between about 2 and 6; and wherein Ra$_1$-Ra$_6$, Rb$_1$-Rb$_6$, Rc$_1$-Rc$_2$, and Rd$_1$-Rd$_2$ are independently selected from the group consisting of a hydrogen atom, a linear alkyl group with up to 10 carbons, and a branched alkyl group with up to 10 atoms.

As anhydride co-monomer components, other anhydride can be also used. A structure of dianhydride is not limited. For example, dianhydride is one represented in formula (vi):

formula (vi)

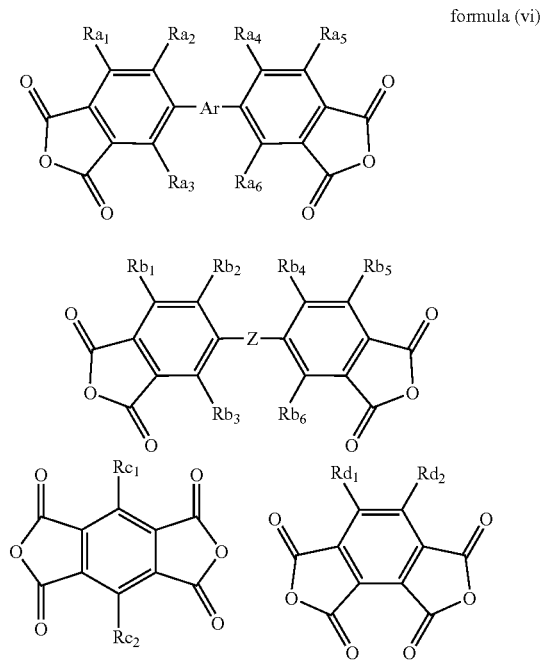

wherein Ar is selected from the group consisting of ether, a linear alkyl group with up to 10 carbons, a branched alkyl group with up to 10 carbons, and an aromatic group with up to 10 carbons; Z represents an oxygen, sulfur, sulfonyl, or alkylene group, with or without fluorine or a hetero atom, such as oxygen or sulfur, and preferably Z is an oxygen, —C(CF$_3$)$_2$—, or alkylene group represented by (CH$_2$)$_p$; where p is between about 2 and 6; and wherein Ra$_1$-Ra$_6$, Rb$_1$-Rb$_6$, Rc$_1$-Rc$_2$, and Rd$_1$-Rd$_2$ are independently selected from the group consisting of a hydrogen atom, a linear alkyl group with up to 10 carbons, and a branched alkyl group with up to 10 atoms.

The ratio of trifluorovinyl containing anhydride and non-trifluorovinyl-containing anhydride is not limited. Any ratio mixture can be used. Furthermore, trifluorovinyl containing anhydride is not necessary to be used, as long as the trifluorovinyl group is incorporated into diamine moiety. However, the ratio of these two monomers can contribute the final optical composition properties, after crosslinking. The more trifluorovinyl group ratio is, the harder and higher Tg can be observed in the final compositions.

Also, a structure of a trifluorovinyl group containing diamine is not limited. For example, diamine is one represented in formula (vii):

formula (vii)

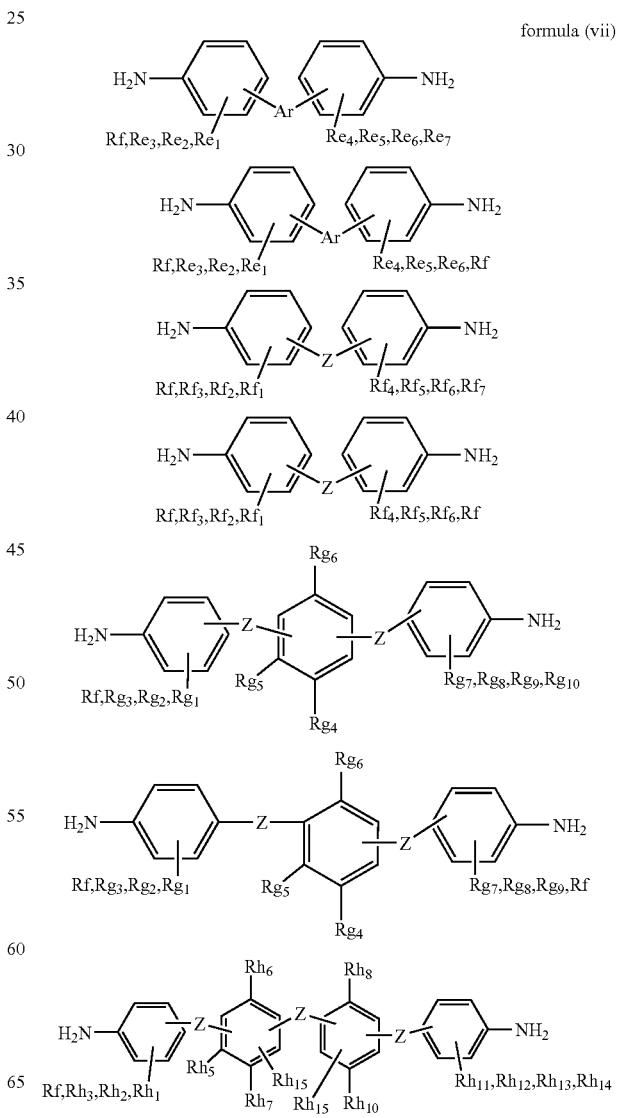

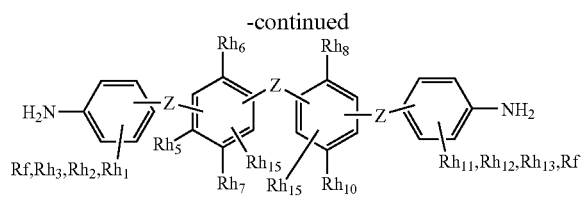

wherein Rf is a trifluorovinyl group, Ar is selected from the group consisting of ether, a linear alkyl group with up to 10 carbons, a branched alkyl group with up to 10 carbons, and an aromatic group with up to 10 carbons; Z and Z' independently represent an oxygen, sulfur, sulfonyl, or alkylene group, with or without fluorine or a hetero atom, such as oxygen or sulfur, and preferably Z and Z' are independently an oxygen, —C(CF$_3$)$_2$—, or alkylene group represented by (CH$_2$)p; where p is between about 2 and 6; and wherein Re$_1$-Re$_8$, Rf$_1$-Rf$_8$, Rg$_1$-Rg$_{10}$, and Rh$_1$-Rh$_{16}$ are independently selected from the group consisting of a hydrogen atom, a linear alkyl group with up to 10 carbons, and a branched alkyl group with up to 10 atoms.

As diamine co-monomer components, other diamine can be also used. A structure of diamine is not limited. For example, diamine is one represented in formula (viii):

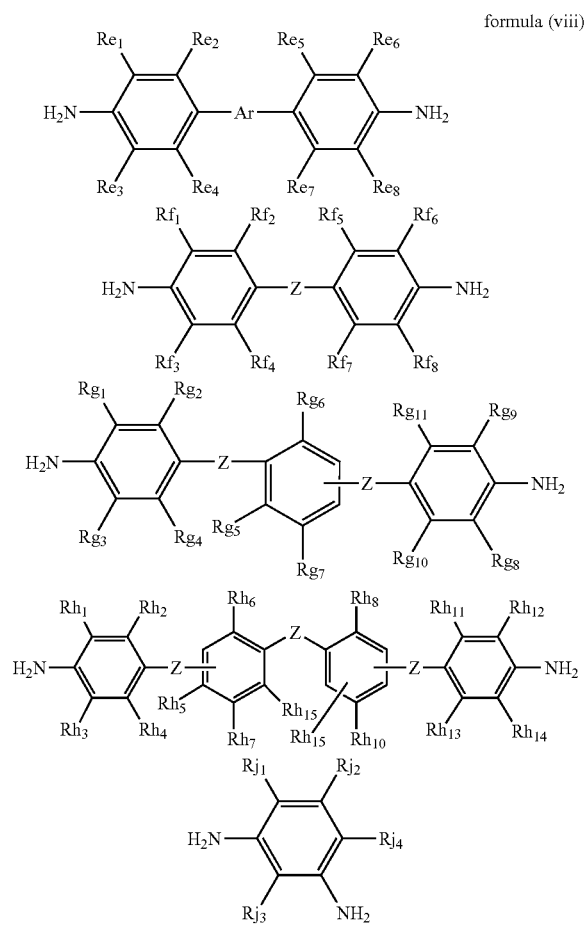

formula (viii)

wherein Ar is selected from the group consisting of ether, a linear alkyl group with up to 10 carbons, a branched alkyl group with up to 10 carbons, and an aromatic group with up to 10 carbons; Z and Z' independently represent an oxygen, sulfur, sulfonyl, or alkylene group, with or without fluorine or a hetero atom, such as oxygen or sulfur, and preferably Z and Z' are independently an oxygen, —C(CF$_3$)$_2$—, or alkylene group represented by (CH$_2$)p; where p is between about 2 and 6; and wherein Re$_1$-Re$_8$, Rf$_1$-Rf$_8$, Rg$_1$-Rg$_{10}$, Rh$_1$-Rh$_{16}$, and Rj$_1$-Rj$_4$ are independently selected from the group consisting of a hydrogen atom, a linear alkyl group with up to 10 carbons, and a branched alkyl group with up to 10 atoms.

The ratio of trifluorovinyl containing diamine and non-containing diamine is not limited. Any ratio mixture can be used. Furthermore, trifluorovinyl containing diamine is not necessary to be used, as long as this group is incorporated into dianhydride moiety. However, the ratio of these two monomers can contribute the final optical composition properties, after crosslinking. The more trifluorovinyl group ratio is, the harder and higher Tg can be observed in the final compositions.

A trifluorovinyl group on a benzene ring preferably can be attached from the corresponding iodo-derivative by one-step reaction, as described in the below. Detail of this conversion reaction was reported in the prior art (M. Yamamoto, D. C. Swenson and D. J. Burton, Macromol. Symp. Vol. 82, 125 (1994)).

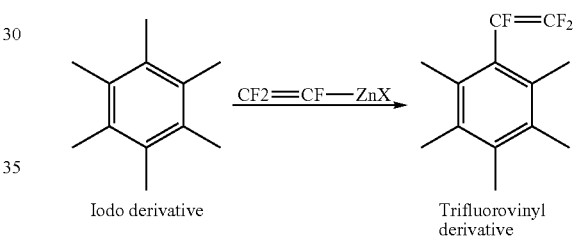

Iodo derivative      Trifluorovinyl derivative

In this step, a trifluorovinyl zinc reagent (chemical formula is depicted as CF$_2$=CF—ZnX) may be used for the above reaction in presence of palladium catalysis. As an example of the palladium catalysis, typically Pd(PPh$_3$)$_4$ can be used. The reaction is preferably carried out at a temperature of from about 80° C. to 120° C., and is allowed to continue for about 1 to 100 hours. Usually, the generally used inactive and dried gas is, preferably, nitrogen, argon, or helium. Reaction pressure is from 1 to 50 atom, preferably from 1 to 5 atom. The addition ratio of zinc reagent is desired to be more than one molar equivalent to the existing iodo precursor. Preferably, ratio of anhydride is from 1 to 3 molar equivalent.

A zinc reagent (CF$_2$=CF—ZnX) preferably can be prepared from trifluoro halide ethane (CF$_2$=CF—X) and zinc in presence of one or mixture of polar solvents, such as dimethylacetamide, N-methylpyrolidone, DMF, THF, or DMSO. Most preferably DMF can be used and the zinc reagent is a solution form of the above solvents. More detail synthetic procedure is also described in the previous prior art.

Usually, two steps are required for preparing polyimide. In the first step of the polymerization, both dianhydride and diamine are mixed and simply stirred in the presence of one or mixture of polar solvents, such as dimethylacetamide, N-methylpyrolidone, DMF, THF, or DMSO. Usually, no special catalysis is required. The solvent is generally used in an amount of from 100 to 10000 wt %, preferably from 900 to 5000 wt %, per weight of the sum of the polymerizable monomers.

The conventional polycondensation is preferably carried out at a temperature of from about 0° C. to 100° C., and is allowed to continue for about 1 to 100 hours, depending on the desired final molecular weight and polymerization temperature, and taking into account the polymerization rate.

The purity of the monomers is important, because higher molecular weight polyimide can be obtained from the higher purity monomers. Desirably, the monomer purity ratio of diamine and dianhydride is more than 98%. More preferably, it is higher than 99.5%.

Usually, the generally used inactive and dried gas is, preferably, nitrogen, argon, or helium. Polymerization pressure is from 1 to 50 atom, preferably from 1 to 5 atom. From a view point of preventing the monomer from undesired decomposition (particularly in the case of dianhydride), inactive and dried gas polymerization atmosphere is preferable.

The monomer molar ratio of diamine and dianhydride is desired to be exactly 1.0, in order to get very high molecular weight polyimide. If either dianhydride or diamine is excess molar ratio, the molecular weight of polymer results in lower. Usually, the higher molecular weight polymer can lead to better polymer film quality, although it depends on polymer structure.

The second step of the polyimide preparation is a dehydration and ring closure reaction step. This process is usually carried out either by thermal or chemical method.

In case of thermal conversion method, heating polyamic acid leads to polyimide. This process can be carried out either in presence of solvent or without solvent. In the presence of solvent, one or mixture of polar solvents, such as dimethylacetamide, N-methylpyrolidone, DMF, THF, or DMSO, can be used. Also, a solvent that can form azeotropic mixture with water, such as toluene and xylene, is desirably added, in order to remove by-product water after dehydration reaction. Preferably, over 100° C. heating is necessary for the conversion. On the other hand, in non solvent type case, polyamic acid may be heated up in the oven or vacuum oven in order to remove resulted water. Preferably, high temperature over 100° C. is necessary in non-solvent case.

However, the polyimide used in the present invention preferably contains thermally crosslinkable trifluorovinyl group in the structure. So, high temperature heating process is not suitable, because undesired crosslinking may occur in heating process. Usually, a trifluorovinyl group can start to crosslink over 140° C., so high temperature heating which is close to 140° C. ought to be avoided. Due to this nature of the trifluorovinyl group, usually heating process is not suitable process to convert polyamic acid into polyimide, although optimized condition can do so without undesired crosslinking reaction during this process.

On the other hand, chemical method can convert polyamic acid to polyimide more efficiently in this trifluorovinyl containing polyimide, because no high temperature heating process is required.

In this process, excess amount of anhydride derivative can proceed to the conversion from amic acid form to imide form in the presence of a catalysis. As a solvent, one or mixture of polar solvents, such as dimethylacetamide, N-methylpyrolidone, DMF, THF, or DMSO, can be used. Usually, a solvent system, which is used for a polycondensation reaction, can be used without any change for imidation step.

The solvent is generally used in an amount of from 100 to 10000 wt %, preferably from 900 to 5000 wt %, per weight of the polyamic acid.

The conversion reaction is preferably carried out at a temperature of from about 0° C. to 100° C., and is allowed to continue for about 1 to 100 hours, depending on the conversion rate.

Usually, the generally used inactive and dried gas is, preferably, nitrogen, argon, or helium. Polymerization pressure is from 1 to 50 atom, preferably from 1 to 5 atom. From a view point of preventing the monomer from undesired decomposition (particularly in the case of dianhydride), inactive and dried gas polymerization atmosphere is preferable.

Preferable anhydride is one or mixture of the groups which comprise acetic anhydride, propionic anhydride, or phtalic anhydride. Most preferably acetic anhydride can be used. The addition ratio of anhydride is desired to be more than one molar equivalent to the existing amic acid group. Preferably, the ratio of anhydride is from 1 to 10 molar equivalent. Furthermore, a preferable catalysis is one or mixture of pyridine derivatives, such as pyridine, bipyridine, or dimethylamino pyridine. The addition ratio of the catalysis is desired to be more than 0.01 molar equivalent to the existing amic acid group. Preferably, the ratio of the catalysis is from 0.1 to 0.5 molar equivalent.

After these polycondensation, followed by conversion to the imide form, the reaction mixture preferably can be poured into one or mixture of solvents, such as water, methanol, ethanol, or isopropanol. By doing so, only a polyimide polymer can be precipitated and collected. Proper washing the precipitation with those solvent and drying over vacuum can lead to this polyimide material used in the present invention as a pure form.

Physical properties of the formed polyimide that are of importance are the molecular weight and the glass transition temperature, Tg. Also, it is valuable and desirable, although not essential, that the polyimide should be capable of being formed into films, coatings and shaped bodies of various kinds by standard polymer processing techniques, such as solvent coating, injection molding and extrusion before crosslinking.

In the present invention, the polyimide preferably has a weight average molecular weight, Mw, from about 3,000 to 500,000, more preferably from about 5,000 to 100,000. The term "weight average molecular weight" as used herein means the value determined by the GPC (gel permeation chromatography) method in polyethyleneoxide standards, as is well known in the art.

For good active waveguide material properties, the photorefractive composition is preferable substantially amorphous and non-crystalline or non-glassy before corona polling. Therefore, it is preferred that the pre-crosslinking composition has a relatively low glass transition temperature, Tg, such as below about 150° C., more preferably below about 100° C. Since crosslinking temperature of a trifluorovinyl group is usually around 140-170° C., Tg of the pre-crosslinking composition is desired to be lower than the crosslinking temperature. In this case, chromophore molecules in the composition can be moved and orientated by choosing right conditions and temperature between the composition Tg and the crosslinking temperature.

Nevertheless, it is preferred that the crosslinked polyimide itself has a relatively high glass transition temperature, by which inventors mean a Tg no lower than about 150° C., because undesired disorientation of chromophores is less likely to occur.

Another feature of this invention is a composition which comprises a non-linear optic chromophore components. If this composition comprises a non-linear optic chromophore, the composition can be used for an active optical device material, such as a modulator or switching devices.

For good non-linear optical abilities, the composition can be dispersed with a chromophore that possesses non-linear optical properties through the polymer matrix, as is described in U.S. Pat. No. 5,064,264 to IBM, which is incorporated herein by reference. Also, chromophores described in the literature, such as in D. S. Chemla & J. Zyss, "Nonlinear Optical Properties of Organic Molecules and Crystals" (Academic Press, 1987), can be used. Also, as described in U.S. Pat. No. 6,348,992 to Cheng Zhang et. al., sterically stabilized polyene-bridged second-order nonlinear optical chromophores can be used. Or, chromophores described in WO 01/53746 to Pacific Wave Industries Inc., U.S. Pat. No. 6,555,027 to Pacific Wave Industries Inc., US2002/0027220 to Chuanguang Wang, U.S. Pat. No. 6,616,865 to Cheng Zhang, U.S. Pat. No. 6,067,186 to Larry R. Dalton, and U.S. Pat. No. 6,361,717 to Larry R. Dalton.

For typical, non-limiting examples of chromophore additives, the following chemical structure compounds preferably can be used:

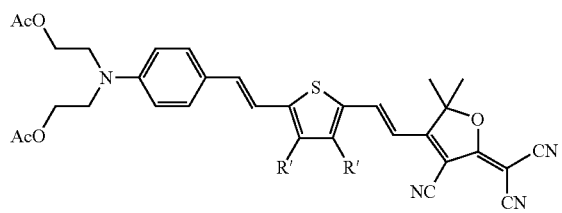

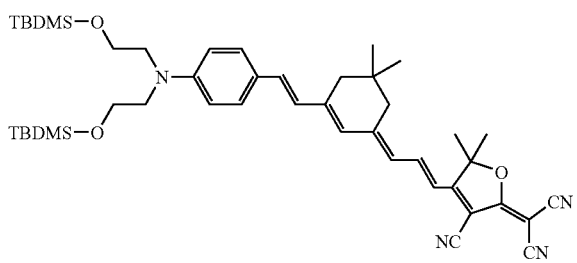

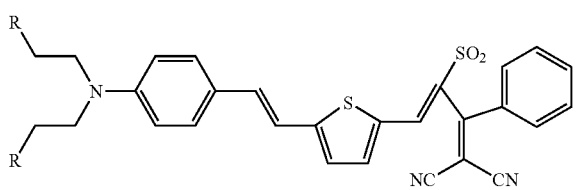

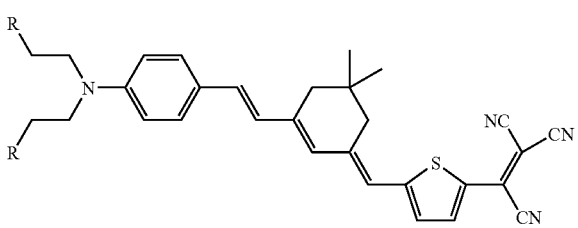

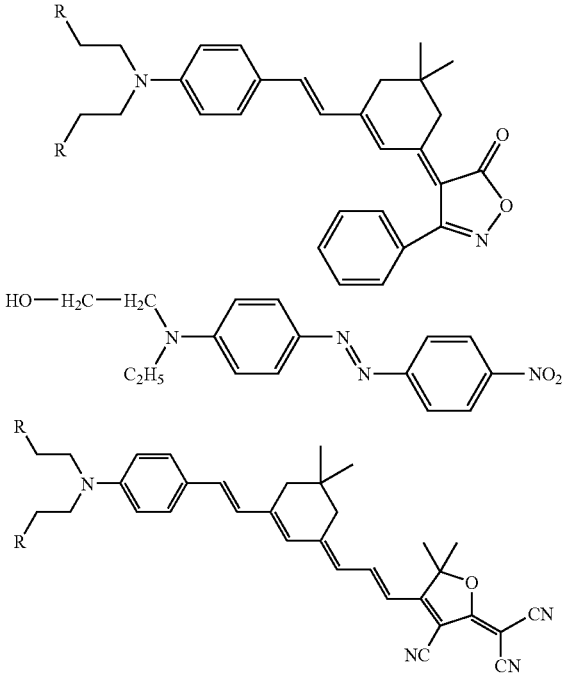

wherein R is independently selected from the group consisting of a hydroxyl, acetoxy, hydrogen atom, a linear alkyl group with up to 10 carbons, and a branched alkyl group with up to 10 atoms.

Beside these typical chromophores, the following chromophore which are described in formula (iii) preferably can be used:

Formula (iii)

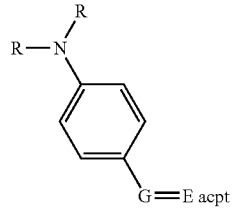

wherein R is selected from the group consisting of a hydrogen atom, a linear alkyl group with up to 10 carbons, a branched alkyl group with up to 10 carbons, aromatic group with up to 10 carbons, hydroxyl, and acetoxy group; G is a group having a bridge of π-conjugated bond; and Eacpt is an electron acceptor group.

In the above definition, by the term "a bridge of π-conjugated bond", it is meant a molecular fragment that connects two or more chemical groups by π-conjugated bond. A π-conjugated bond contains covalent bonds between atoms that have σ bonds and π bonds formed between two atoms by overlap of their atomic orbitals (s+p hybrid atomic orbitals for σ bonds; p atomic orbitals for π bonds).

By the term "electron acceptor", it is meant a group of atoms with a high electron affinity that can be bonded to a π-conjugated bridge. Exemplary acceptors, in order of increasing strength, are:

$C(O)NR_2 < C(O)NHR < C(O)NH_2 < C(O)OR < C(O)OH < C(O)R < C(O)H < CN < S(O)_2R < NO_2$

As typical exemplary electron acceptor groups, functional groups which are described in prior art U.S. Pat. No. 6,267,913 and shown in the following structure figure can be used. U.S. Pat. No. 6,267,913 is hereby incorporated by reference for the purpose of describing donors and acceptors useful in this invention. The symbol "‡" in a chemical structure herein specifies an atom of attachment to another chemical group and indicates that the structure is missing a hydrogen that would normally be implied by the structure in the absence of the "‡".

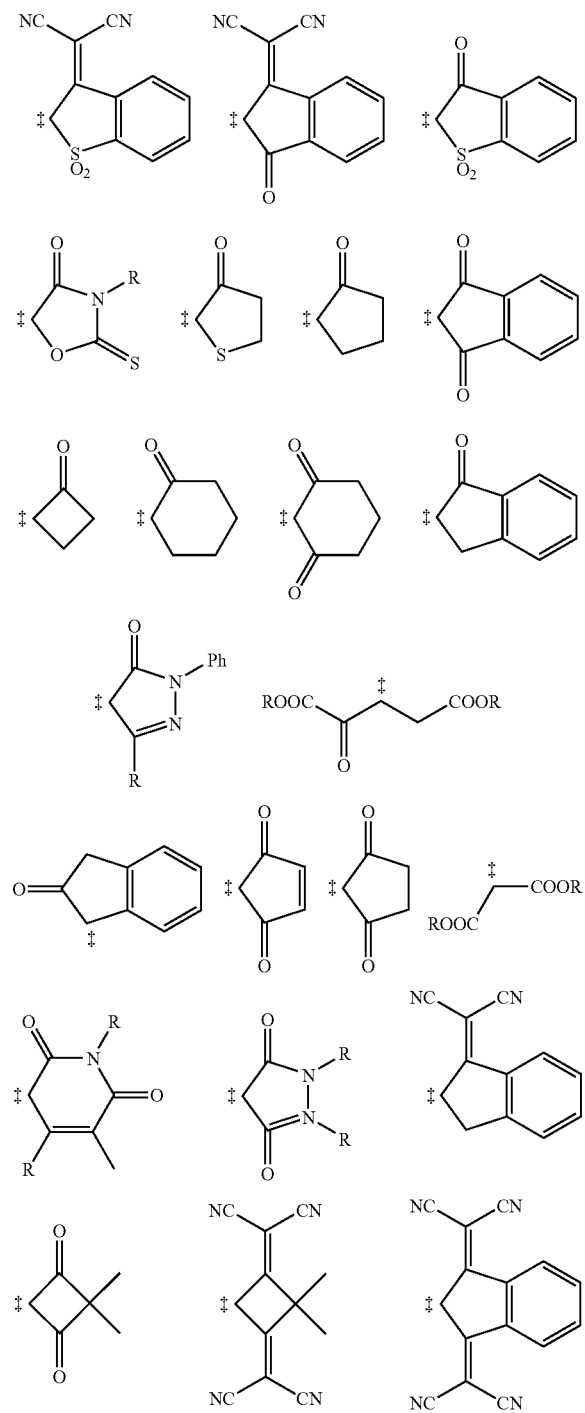

-continued

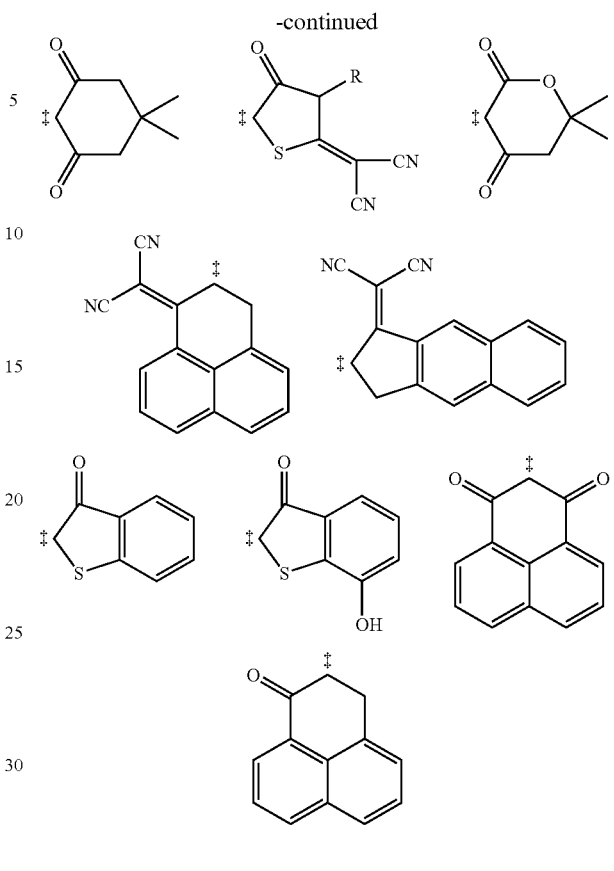

wherein R is selected from the group consisting of a hydrogen atom, a linear alkyl group with up to 10 atoms, a branched alkyl group with up to 10 atoms, and an aromatic group with up to 10 carbons.

The chosen chromophore(s) is mixed in the matrix copolymer in a concentration of about preferably up to 50 wt %, more preferably 10-30 wt %.

Another feature of this invention is a composition which preferably comprises a non-linear optic chromophore that contains a trifluorovinyl unit represented by the formula (i):

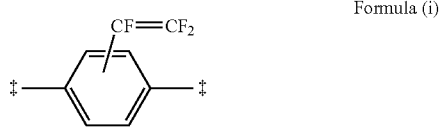

Formula (i)

The symbol "‡" in the chemical structure herein specifies an atom of attachment to another chemical group. This trifluorovinyl containing moiety can preferably form bimolecular cyclic compounds by heating, as same as this group is incorporated in polyimide matrix side chain. The corresponding thermal dimerization crosslinking reaction can proceed even in the presence of air and even corporate inside of matrix. Also, if this trifluorovinyl groups are incorporated in chromophore moiety too, the chromophore moiety is also crosslinked with a trifluorovinyl containing matrix polymer. As a result, more rigid composition can be obtained than non trifluorovinyl containing chromophore case. Furthermore, original chromophore direction can be fixed and less likely to move around in the matrix. So, if the direction of chromophore is orientated toward one direction by polling process before crosslinking this system, the orientated chromophore direction can be fixed and longer thermal stabilities can be expected.

The above formula (i) may be represented by the following formula (ix):

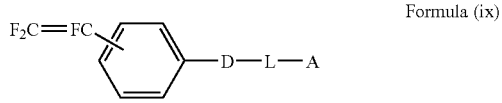

Formula (ix)

wherein D represents a donor, L represents a linker and A represents an acceptor. A "donor" is an atom or group of atoms that has a low oxidation potential, wherein the atom or group of atoms can donate electrons to an acceptor "A" through π-bridge. The donor (D) has a lower electron affinity that does the acceptor (A), so that the chromophore is generally polarized, with relatively less electron density on the donor (D). Typically, a donor group contains at least one heteroatom that has a lone pair of electrons capable of being in conjugation with the p-orbitals of an atom directly attached to the heteroatom such that a resonance structure can be drawn that moves the lone pair of electrons into a bond with the p-orbital of the atom directly attached to the heteroatom to formally increase the multiplicity of the bond between the heteroatom and the atom directly attached to the heteroatom (i.e., a single bond is formally converted to double bond, or a double bond is formally converted to a triple bond) so that the heteroatom gains formal positive charge. The p-orbitals of the atom directly attached to the heteroatom may be vacant or part of a multiple bond to another atom other than the heteroatom. The heteroatom may be a substituent of an atom that has pi bonds or may be in a heterocyclic ring. Exemplary donor groups include but are not limited to $R_2N-$, and $RX-$, where R is alkyl, aryl, and heteroaryl, X is O, S, Se, or Te.

A "linker" is a molecular fragment that connects two or more chemical groups by π-conjugated bond. A π-conjugated bond contains covalent bonds between atoms that have σ bonds and π bonds formed between two atoms by overlap of their atomic orbitals (s+p hybrid atomic orbitals for σ bonds; p atomic orbitals for π bonds).

An "acceptor" is an atom or group of atoms that has a low reduction potential, wherein the atom or group of atoms can accept electrons from a donor through a A-bridge. The acceptor (A) has a higher electron affinity that does the donor (D), so that the chromophore is generally polarized, with relatively more electron density on the acceptor (D). Typically, an acceptor group contains at least one electronegative heteroatom that is part of a pi bond (a double or triple bond) such that a resonance structure can be drawn that moves the electron pair of the pi bond to the heteroatom and concomitantly decreases the multiplicity of the pi bond (i.e., a double bond is formally converted to single bond or a triple bond is formally converted to a double bond) so that the heteroatom gains formal negative charge. The heteroatom may be part of a heterocyclic ring. Exemplary acceptor groups include but are not limited to $-NO_2$, $-CN$, $-CHO$, $-COR$, $-CO_2R$, $-PO(OR)_3$, $-SOR$, $-SO_2R$, and $-SO_3R$ where R is alkyl, aryl, and heteroaryl. The total number of heteroatoms and carbons in an acceptor group is about 30, and the acceptor group can be substituted further with alkyl, aryl, and heteroaryl. The "donor" and "acceptor" terminology is well known and understood in the art of the present invention.

For typical, non-limiting examples of trifluorovinyl containing non-linear optic chromophores, the following chemical structure compounds preferably can be used:

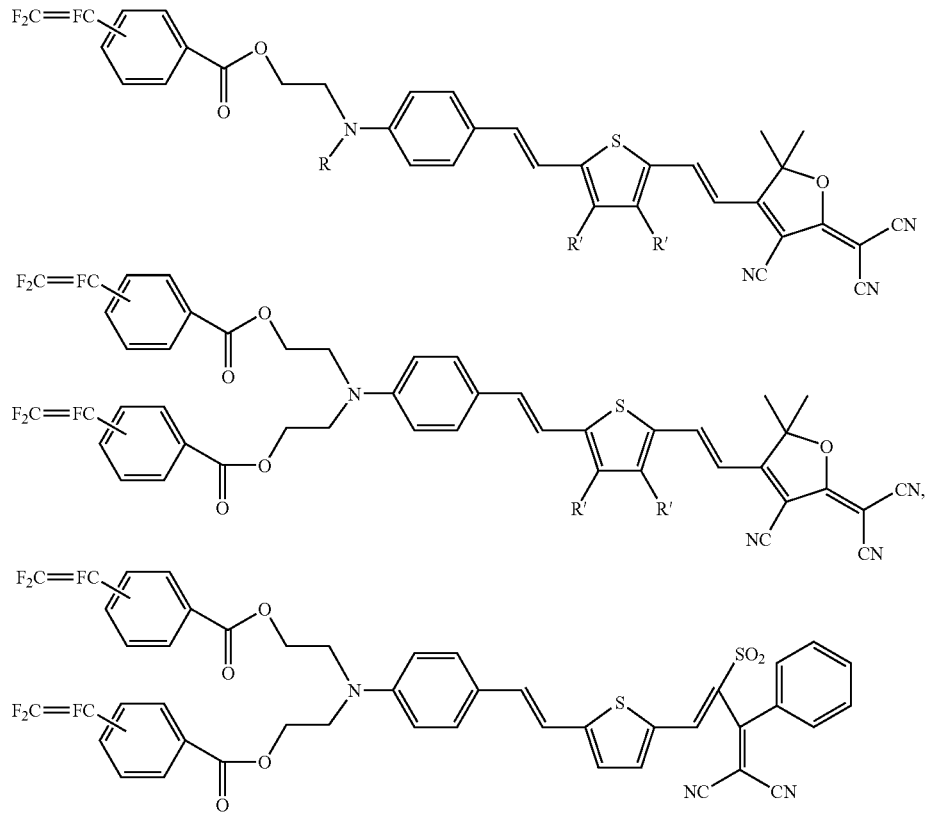

-continued
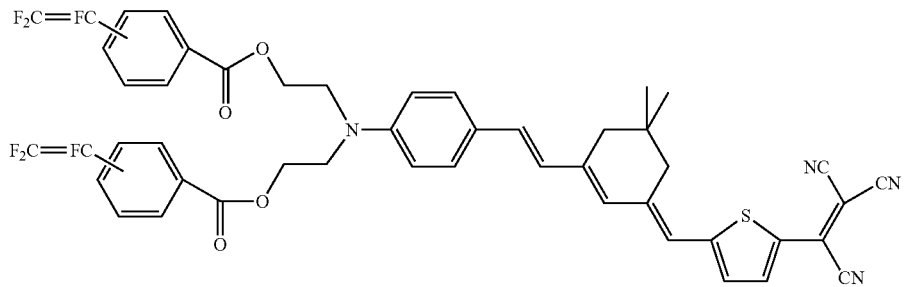
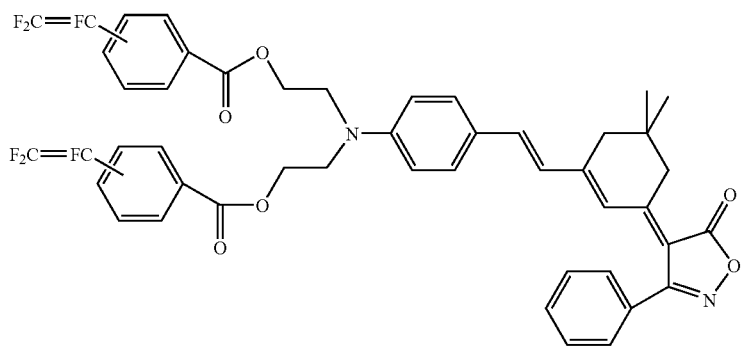
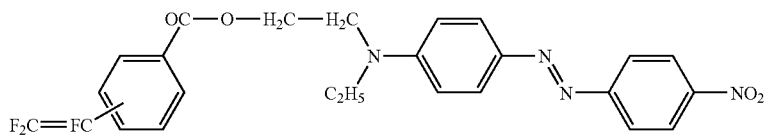
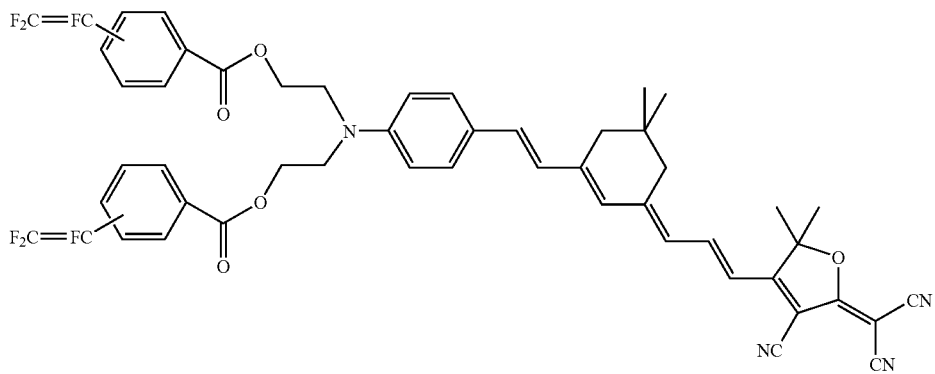
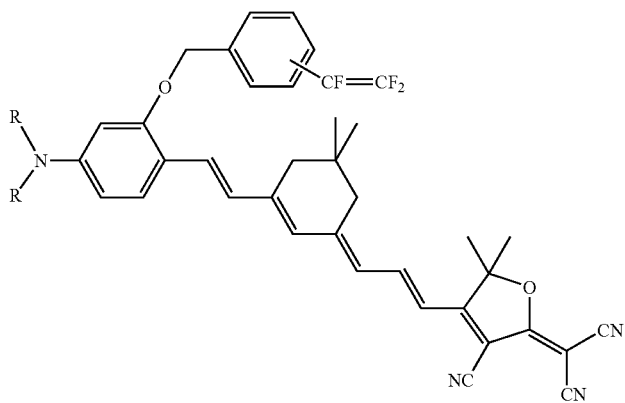

wherein R and R' are each independently selected from the group consisting of a hydroxyl, acetoxy, hydrogen atom, a linear alkyl group with up to 10 carbons, and a branched alkyl group with up to 10 atoms.

A trifluorovinyl group on a benzene ring can be attached from the corresponding iodo-derivative by one-step reaction, by the same manner with described in the above.

In this step, a trifluorovinyl zinc reagent is preferably used for the above reaction in the presence of a palladium catalysis. The reaction is preferably carried out at a temperature of from about 80° C. to 120° C., and is allowed to continue for about 1 to 100 hours. Usually, the generally used inactive and dried gas is, preferably, nitrogen, argon, or helium. Polymerization pressure is from 1 to 50 atom, preferably from 1 to 5 atom. The addition ratio of the zinc reagent is desired to be more than one molar equivalent to the existing iodo precursor. Preferably, the ratio of anhydride is from 1 to 3 molar equivalent.

A zinc reagent can be prepared from trifluoro halide and zinc in the presence of one or mixture of polar solvents, such as dimethylacetamide, N-methylpyrolidone, DMF, THF, or DMSO. Most preferably DMF can be used and the zinc reagent can be stored stably as a solution form of the above solvents.

A trifluorovinyl group can also be incorporated into the above formula (iii) chromophores.

In preferred embodiments, the formula (ix) can be represented by the following formula (x):

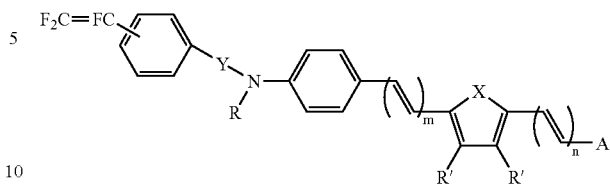

Formula (x)

wherein X is oxygen or sulfur, and is preferably oxygen; Y is a bivalent group, and is preferably —C(=O)O(CH$_2$)$_a$— where a is an integer of from 1 to 8, and is preferably an integer from 3 to 6; A is an acceptor, and is preferably an acceptor represented by the following structure; R and R' are each independently selected from the group consisting of a hydrogen atom, a linear alkyl group with up to 10 carbons, and a branched alkyl group with up to 10 atoms; m and n are each independently an integer of from 1 to 5.

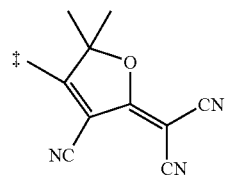

In preferred embodiments, the formula (x) includes the following structures:

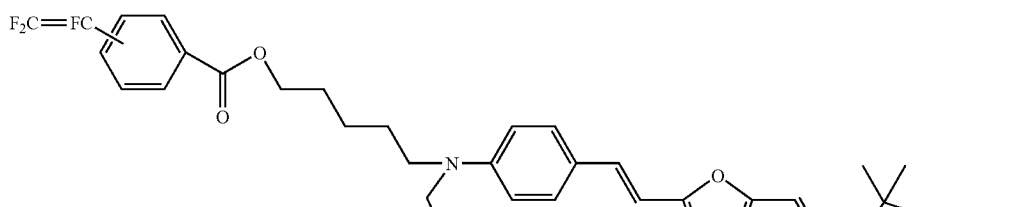

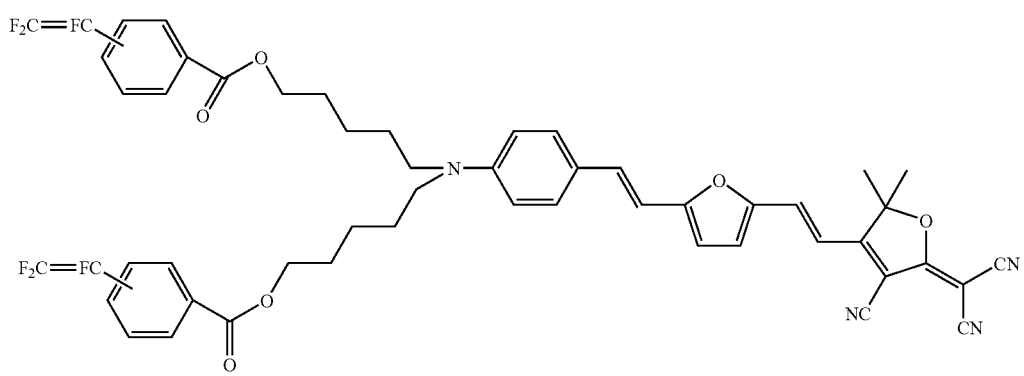

-continued

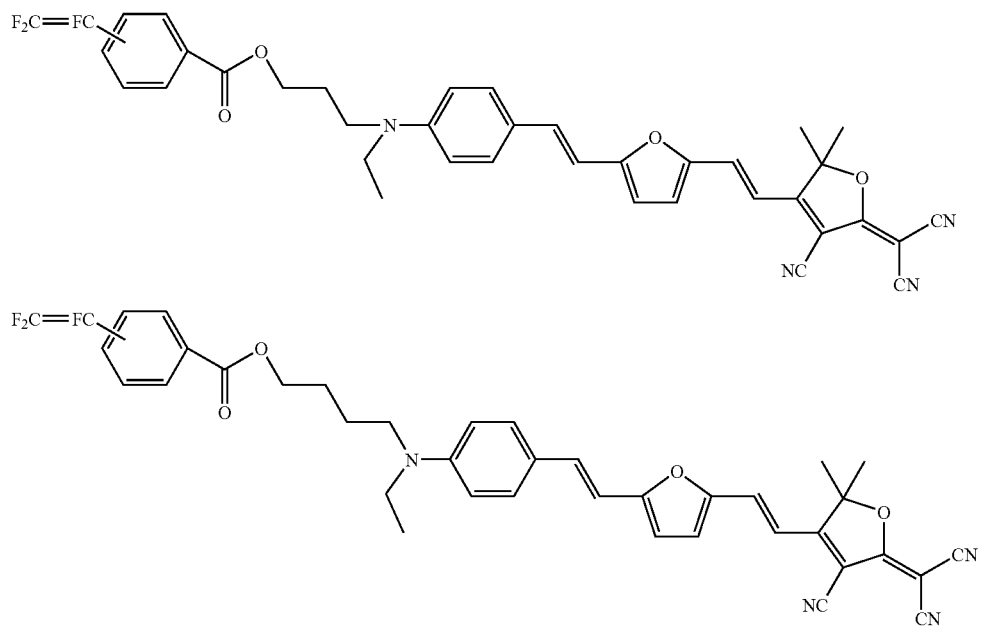

The chosen trifluorovinyl containing chromophore(s) is mixed in the matrix copolymer in a concentration of about preferably up to 50 wt %, more preferably 10-30 wt %.

The measurements and characterizations of the invention material include: refractive index, loss measurement, EO coefficient ($r_{33}$) measurement and processing compatibility.

The goal of compositions is to improve device performance and reduce device cost. The device performance improvements include a) reduce propagation loss; b) improve processability; c) increase electro optical stability. The cost reductions include processing and packaging costs.

The invention is now further described by the following examples, which are intended to be illustrative of the invention, but are not intended to limit the scope or underlying principles in any way.

EXAMPLES

Key Reagent Preparation

Trifluoro Zinc Reagent ($CF_2$=CF—ZnBr)

A two-necked flask equipped with Teflon-coated magnetic stir bar, a dry ice/IPA condenser, and an immersion thermometer was charged with zinc (8.8 g, 138 mol) and 140 mL anhydrous DMF. The contents of the flask were stirred vigorously at room temperature for 20 minutes. Bromotrifluoroethylene (26 g, 0.16 mol) was collected via a dry-ice/IPA condenser into graduated cylinder and then the condenser attached to the cylinder was quickly replaced by a tee-tube. The other end of the tee tube was connected to the dry ice/IPA condenser over the reaction flask. Bromotrifluoroethylene was slowly warmed and the gas was condensed into reaction flask via a dry ice/IPA condenser. The start of the reaction was indicated by a rise in temperature to 50-70° C. After all the ethylene had been added, the flask was removed at room temperature and put into vacuum to remove unreacted excess ethylene. Then, $CF_2$=CF—ZnBr/DMF reagent was obtained.

Production Example 1 a) Synthetic Method for Trifluorovinyl Containing Tetraphenyl Diamine (TF-BAPF)

In order to obtain the polyimide material used in the present invention, the corresponding trifluorovinyl containing tetraphenyl diamine was required to be synthesized. By optimizing synthetic studies, the following synthetic pathway seems to be most efficient, as one of synthetic procedures.

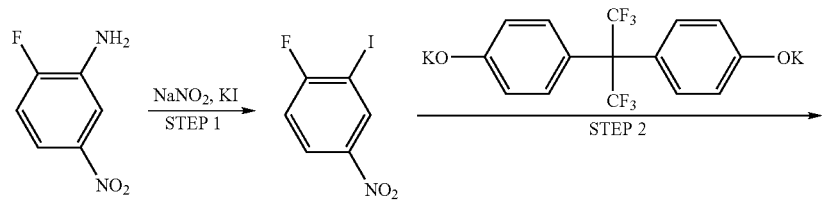

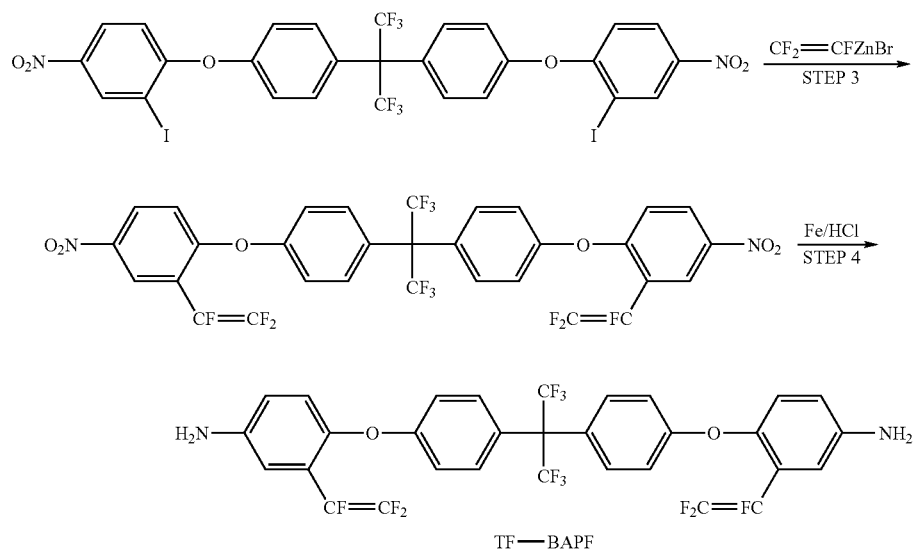

TF—BAPF

Step 1:

2-Fluoro-5-nitroaniline (5.8 g, 23.3 mmol) was suspended in water (25 mL). Into this mixture, hydrochloric acid (4.2 mL, 30 mmol) was added. Then, $NaNO_2$ (4 g, 30 mmol) water solution was added with ice bath cooling. This solution was stirred at 0° C. for 2 hrs. Then, potassium iodide (5.8 g, 23.3 mmol) water solution was added and stirred at room temperature for 2 hrs. After cooling down, crude product was precipitated and collected. The precipitate was purified by silica gel chromatography (eluent: hexane/acetone=9/1). Powdery compound was obtained. (Yield: 6.0 g (80%))

Step 2:

Bis-4-hydroxyphenyltrifluoroisopropylidene (2.4 g, 7.1 mmol) was dissolved with DMSO (12 mL). Potassium tert-butoxide (90%) (2.0 g, 16 mmol) was added into this solution at room temperature and stirred at room temperature for 2 hrs. Into this reaction solution, THF (12 mL) solution of 3-iodo-4-fluoro-nitrobenzene (3.8 g, 14.2 mmol) was added and heated up at 50° C. for 2 hrs. Then, the reaction mixture was cooled, and poured into water and extracted by ether. The ether layer was washed with brine solution and dried over anhydrous magnesium sulfate. After removing the magnesium sulfate, the solvent was removed and the residue was purified by silica gel chromatography (developing solvent: dichloromethane). Powdery compound was obtained. (Yield: 3.9 g (95%))

Step 3:

Into a two-neck flask, equipped with a nitrogen inlet, $Pd(PPh_3)_4$ (2.1 g) and the diiodo derivative (73.0 g, 87.9 mmol) were charged. The previously described $CF_2$=CF—ZnBr in DMF (140 mL) was added and the solution was heated at 85° C. for an overnight. The solution was poured into brine water and resulted slurry compounds were removed by filtration. By ether, the slurry was extracted and rinsed to get target dinitro derivative. The ether layer was dried over anhydrous magnesium sulfate. After removing the magnesium sulfate, the solvent was removed and the residue compound was purified by silica gel chromatography (developing solvent: hexane/dichloromethane=1/1). The compound yield was 44.8 g (69%).

Step 4:

In a flask that is equipped with reflux condenser, the dinitro derivative (10.0 g, 13.5 mmol) and iron (5.29 g, 94.8 mmol) were suspended in ethanol (200 mL). Into this mixture, conc.-HCl (10.5 mL) was added dropwisely. The solution was heated up and refluxed for 2 hrs. After the reaction, the iron catalysis was removed by filtration. The solution was poured into aqueous 1M NaOH solution (50 mL) for neutralization and extracted by dichloromethane. The dichloromethane layer was dried over anhydrous magnesium sulfate. After removing the magnesium sulfate, the solvent was removed and the residue was purified by silica gel chromatography (developing solvent: hexane/ethyl acetate/dichloromethane=2/1/2). The compound yield was 8.73 g (95%).

H-NMR ($CDCl_3$) 7.3 (4H, d, $H_1$), 7.0 (2H, m, $H_2$), 6.9 (4H, d, $H_3$), 6.9 (2H, d, $H_4$), 6.7 (2H, d, $H_5$), 3.7 (3H, bs, $H_6$) (J 1,3=8 Hz, J 4,5=9 Hz), 13C NMR ($CDCl_3$): 158.7 (s), 145.0 (s), 143.1 (s), 131.6 (s), 127.2 (s), 125.8 (td), 125.3 (d), 124.4 (q), 123.6 (s), 119.3 (s), 117.0 (s), 114.8 (d), 107.9 (dt), 63.8 b) Synthetic Method for Polyimide (6F-DA/TF-BAPF) Derivative

Using diamine monomer (TF-BAPF), the target polyimide can be synthesized. Carefully mixing 7.326 g (10.798 mmol) of TF-BAPF with 4.797 g (10.798 mmol) of dianhydride (6F-DA) (manufactured by Central Glass) in a flask. Then, 65 mL of well-dried DMAc was added in the mixture of TF-BAPF and 6FDA to prepare polyamic acid polymer at room temperature. Stir the solution for 16 hours. Then, add 5 mL of acetic anhydride and 2.5 mL of pyridine into the mixture at room temperature and stir them for another 16 hours and convert them into polyimide form. This polyimide solution was poured into MeOH, washed with MeOH several times, and polymers will appear as white precipitation. The white polymer precipitation will be dried over $P_2O_5$ under vacuum.

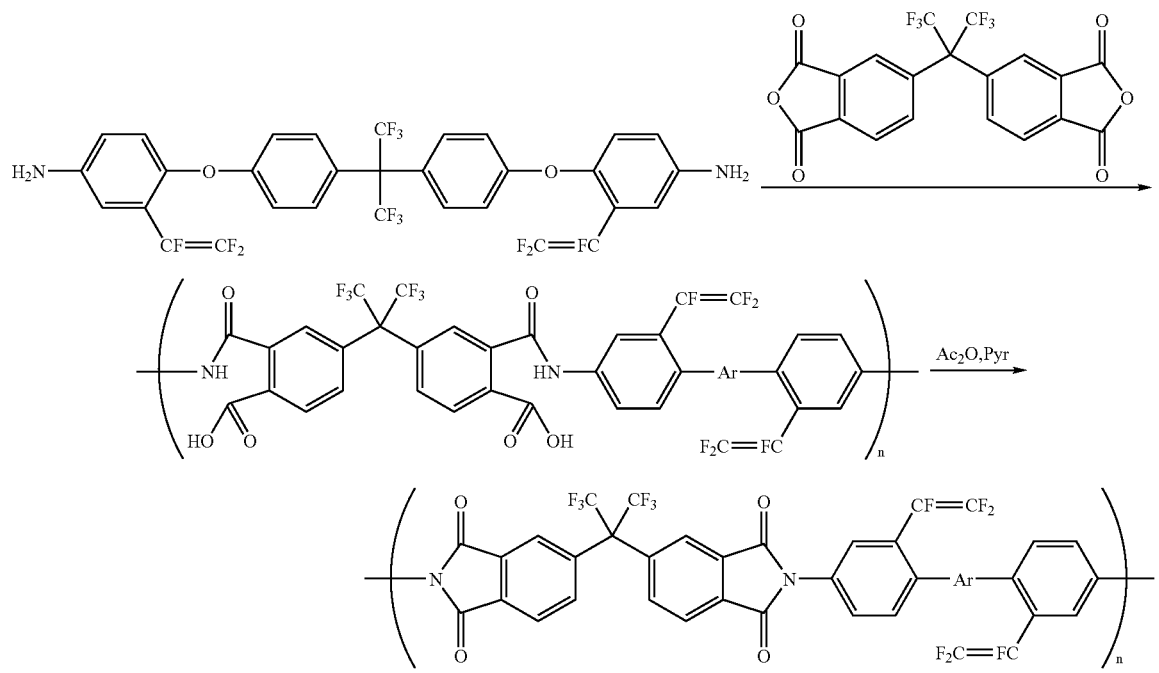

According to GPC results by using polyethylene oxide standard method, molecular weight of the obtained polymer are; Mw (weight average molecular weight)=44,941, Mn (number average molecular weight)=22,773, and Mw/Mn (polydispersity)=1.97.

Production Example 2

Synthetic Method for Four-Components Polyimide (TF-BAPF/APB/6F-DA/ODA) Type

Using diamine monomer (TF-BAPF), the target polyimide can be synthesized. Carefully mixing 2.650 g (3.906 mmol) of TF-BAPF and 1.142 g (3.906 mmol) of APB with 1.736 g (3.906 mmol) of dianhydride (6F-DA) and 1.213 g (3.906 mmol) of OPDA in a flask. Then, 40 mL of well-dried DMAc was added in the mixture of TF-BAPF and 6FDA to prepare polyamic acid polymer at room temperature. Stir the solution for 16 hours. Then, add 5 mL of acetic anhydride and 2.5 mL of pyridine into the mixture at room temperature and stir them for another 16 hours and convert them into polyimide form. This polyimide solution was poured into MeOH, washed with MeOH several times, and polymers will appear as white precipitation. The white polymer precipitation will be dried over $P_2O_5$ under vacuum.

According to GPC results by using polyethylene oxide standard method, molecular weight of the obtained polymer are; Mw (weight average molecular weight)=33,080, Mn (number average molecular weight)=7,700, and Mw/Mn (polydispersity)=4.30.

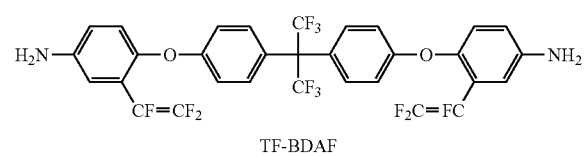

TF-BDAF

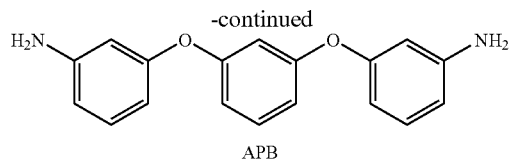

APB

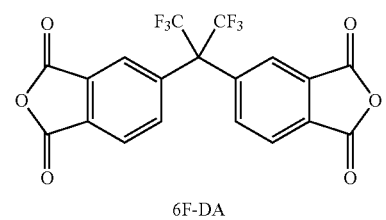

6F-DA

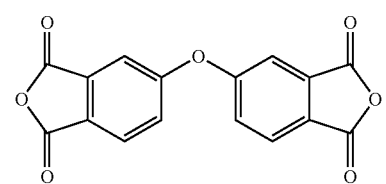

ODPA

<TMA Analysis>

According to TMA film stretching method, Tg (glass transition temperature) of the film was measured and found out to be 150° C. before crosslinking ($1^{st}$ run), in which film thermal expansion coefficient ratio was dramatically altered. During $2^{nd}$ run heating, this transition temperature was raised up to 220° C. This indicates glass transition temperature was increased after heating up and crosslinking. FIG. 1 shows the result.

Production Example 3

Synthetic Method for Trifluorovinyl DR-1 Chromophore (TF-DR-1)

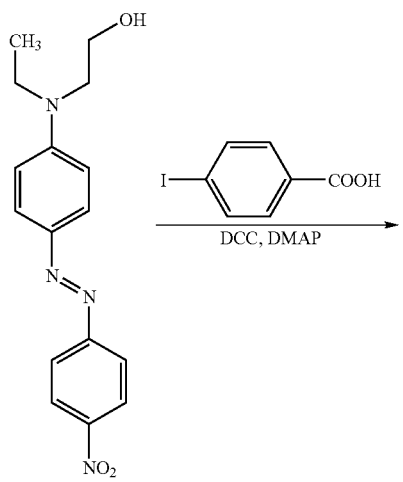

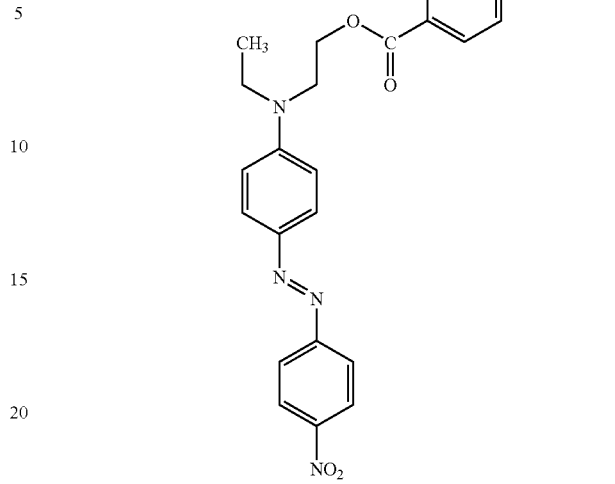

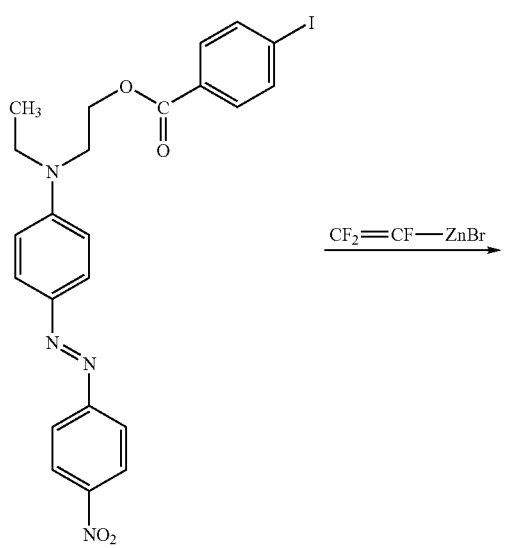

Step 1:

The DR-1 (1.57 g, 5.0 mmol) and 4iodobenzoic acid (1.24 g, 5.0 mmol) were dissolved with anhydrous THF (20 mL). Into this mixture, dicyclocarbodimide (1.13 g, 5.5 mmol) and 4-dimethylaminopyridine (200 mg, 1.64 mmol) were slowly added with cooling by ice-bath. After stirring for an overnight at room temperature, the reaction mixture was directly purified by silica gel chromatography (developing solvent: hexane/acetone=1/1). The compound yield was 5.38 g (76%), and the compound purity was 99% (by GC).

Step 2:

Into a two-neck flask, equipped with a nitrogen inlet, Pd(PPh$_3$)$_4$ (540 mg) and the iodo ester (8.43 g, 15.5 mmol) were charged. CF$_2$=CF—ZnBr in DMF (60 mL, 18 mmol) was added and the solution was heated at 70-80° C. for an overnight. The solution was poured into brine water and extracted by ether. The ether layer was dried over anhydrous magnesium sulfate. After removing the magnesium sulfate, the solvent was removed and the residue acrylate compound was purified by silica gel chromatography (developing solvent: hexane/acetone=1/1). The compound yield was 4.23 g (55%).

Production Example 4

Synthetic Method for Trifluorovinyl FTC Chromophore (TF-FTC)

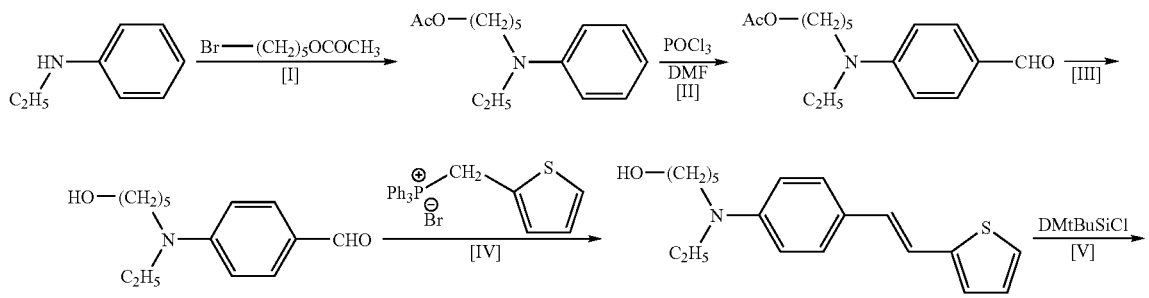

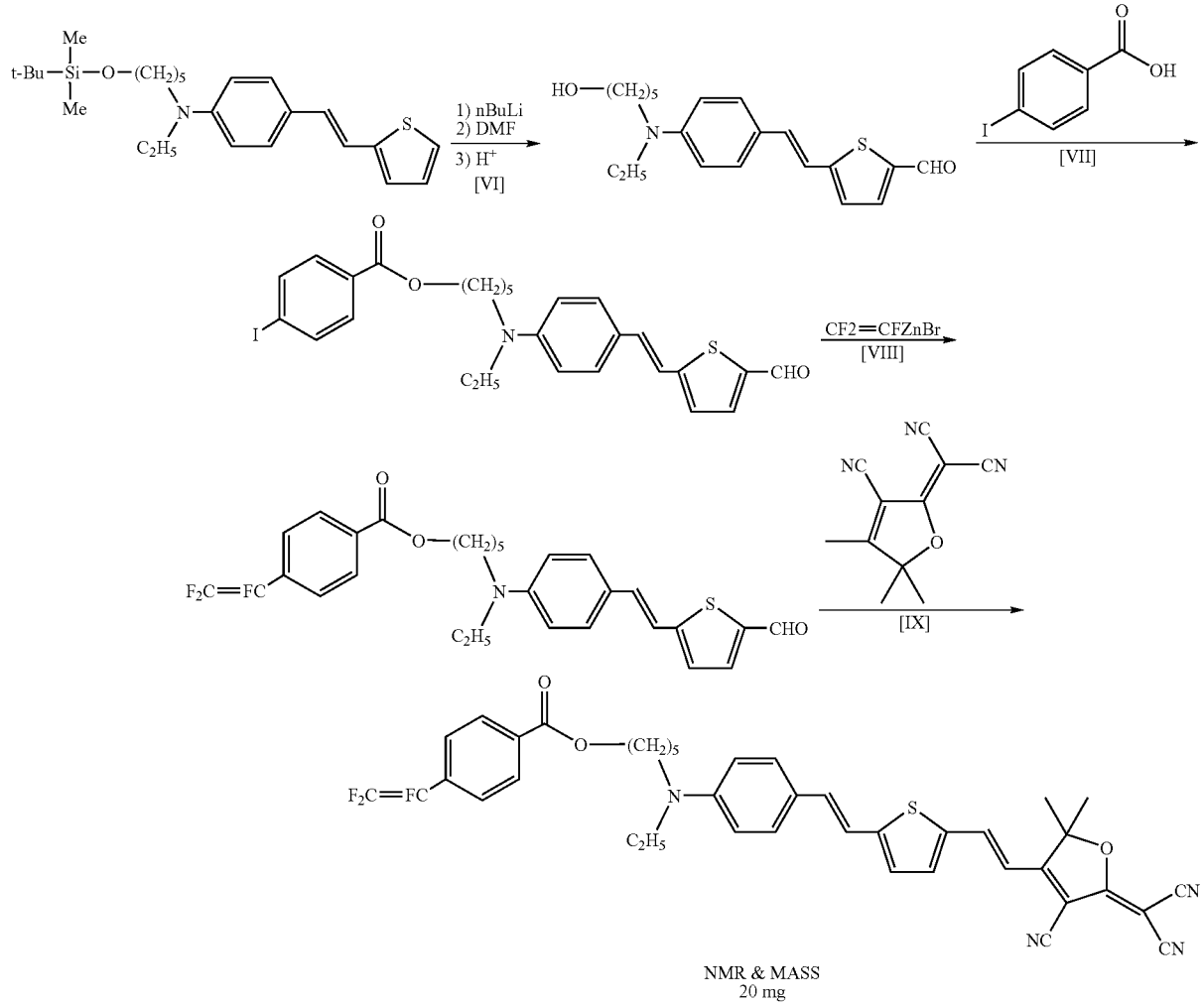

NMR & MASS
20 mg

Step 1:

Into bromopentyl acetate (5 mL, 30 mmol) and toluene (25 mL), triethylamine (4.2 mL, 30 mmol) and N-ethylaniline (4 mL, 30 mmol) were added at room temperature. This solution was heated at 120° C. overnight. After cooling down, the reaction mixture was rotary-evaporated. The residue was purified by silica gel chromatography (developing solvent: hexane/acetone=9/1). An oily amine compound was obtained. (Yield: 6.0 g (80%))

Step 2:

Anhydrous DMF (6 mL, 77.5 mmol) was cooled in an ice-bath. Then, POCl$_3$ (2.3 mL, 24.5 mmol) was added dropwisely into the 25 mL flask, and the mixture was allowed to come to room temperature. The amine compound (5.8 g, 23.3 mmol) was added through a rubber septum by syringe with dichloroethane. After stirring for 30 min., this reaction mixture was heated to 90° C. and the reaction was allowed to proceed overnight under an argon atmosphere.

The next day, the reaction mixture was cooled, and poured into water and extracted by ether. The ether layer was washed with potassium carbonate solution and dried over anhydrous magnesium sulfate. After removing the magnesium sulfate, the solvent was removed and the residue was purified by silica gel chromatography (developing solvent: hexane/ethyl acetate=3/1). An aldehyde compound was obtained. (Yield: 4.2 g (65%))

Step 3:

The aldehyde compound (3.92 g, 14.1 mmol) was dissolved with methanol (20 mL). Into this mixture, potassium carbonate (400 mg) and water (1 mL) were added at room temperature and the solution was stirred overnight. The next day, the solution was poured into brine water and extracted by ether. The ether layer was dried over anhydrous magnesium sulfate. After removing the magnesium sulfate, the solvent was removed and the residue was purified by silica gel chromatography (developing solvent: hexane/acetone=1/1). An aldehyde alcohol compound was obtained. (Yield: 3.2 g (96%))

Step 4:

The starting aldehyde alcohol (5 g, 21.2 mmol) was dissolved in 56 mL of absolute ethanol along with the thiophene salt (2.15 g, 21.2 mmol). To this solution was added, dropwise, a 0.85 M solution of sodium ethoxide (2.15 g of NaOEt dissolved in 37 mL ethanol). After addition, put the mix into 80° C. bath. The clear yellow solution was rotovaped after 5 hours. The mix was purified by silica gel chromatography (using 1 Hex: 1 Eth Aoc) as eluent. The product was a yellow oil. The yield was 77%.

Step 5:

The starting alkene (4 g, 12.7 mmol) was dissolved in 50 mL of dry DMF. The reaction mixture was cooled with an ice bath. Added the silane reagent (2.3 g, 15.2 mmol) and imidazole (2.1 g, 30.8 mmol) let stir at room temperature for 20 min. The reaction mix was extracted with water and pentane after which the organic layer was rotovaped. Got yellow oil. Yield was 100%.

Step 6:

The starting silyl protected alkene (5 g, 11.6 mmol) was dissolved under Argon in −78° C. cooled 50 mL dry THF (dried over Na/Benzophenone). Dropwise, added 14.6 mL of 1.6M $^n$BuLi (23.4 mmol). The dark blue solution was warmed to 0° C. after which 4.2 mL of dry DMF was added. The red solution was stirred at room temperature for one hour. The solution was rotovaped and extracted with ethyl acetate and water (saturated with sodium bicarbonate). The organic layer was purified by silica gel chromatography (7 DCM: 3 Acetone as eluent). The product was a red liquid. The yield was 93%.

The aldehyde (4 g, 8.7 mmol) product was dissolved in 28.7 mL of THF and a mix of HCl/H$_2$O (8 mL of 12.1M HCl in 39.84 mL of H$_2$O) was added. Let stir in 42° C. bath for five hours after which the THF was rotovaped. The solution was neutralized with 5M aqueous ammonia solution and extracted with DCM. The product was purified by silica gel chromatography (7 Eth Aoc: 3Hex). Product was a red liquid. The yield was 87%.

Step 7:

The aldehyde alcohol (2 g, 5.8 mmol) was dissolved in 35 mL of THF. Added iodobenzoic acid (1.44 g, 5.8 mmol) and DCC (1.2 g, 5.8 mmol) and DMAP (0.21 g, 1.7 mmol). Let stir at room temperature overnight after which the product was purified by silica gel chromatography (7 Eth Aoc: 3 Hex and then with 7 Hex: 3 Eth Aoc). The product was a red viscous liquid. The yield was 100%.

Step 8:

The starting aldehyde (3.51 g, 6.1 mmol) was dissolved in 37 mL of DMF. Added 12.2 mL of 1M solution of the CF$_2$═CF—ZnBr reagent. Also added Pd(PPh$_3$)$_4$ (189.7 mg, 0.16 mmol) and put in a 75° C. bath and let go overnight. After cooling, the mix was extracted with ether and ethyl acetate, respectively. The residue was purified by silica gel chromatography (just DCM and then 7 Hex: 3 Eth Aoc). The product was a red solid. The yield was 100%.

Step 9:

The trifluoro aldehyde (3.89 g, 7.4 mmol) was dissolved in 43 mL of chloroform. Added the tricyano furan (1.76 g, 8.8 mmol) and TEA (195 mL, 1.4 mmol). Let stir under Ar in a 61° C. bath. After stirring for 6½ hours, the product was purified by silica gel chromatography (1 Hex: 1 Ace2O and then 1 Hex: 1 Eth Aoc in a very long column). The product was a dark green solid. Yield was 24%. The starting material in this reaction can be recovered and the reaction can be restarted if more products are desired.

Production Example 5

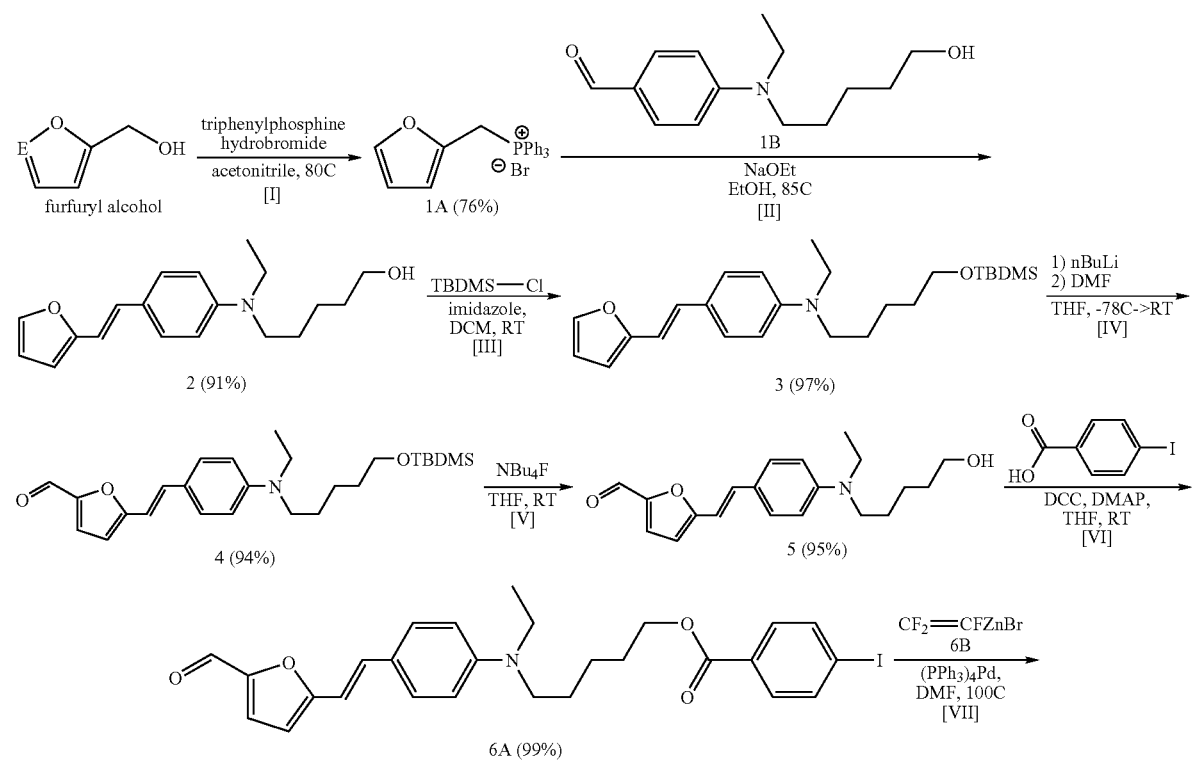

Scheme 1:
Synthesis of chromophore JT-1.

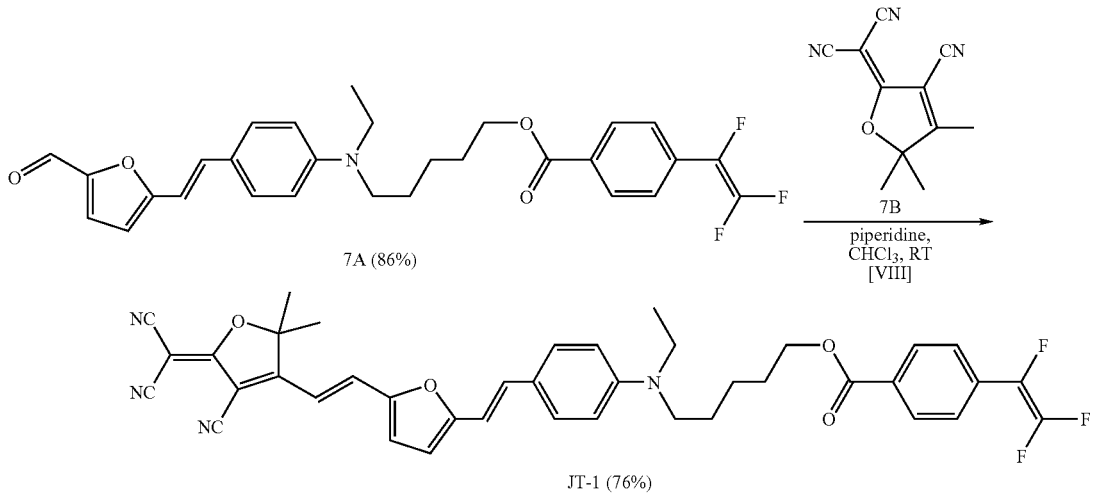

[I]. Synthesis of furfuryl triphenylphosphonium bromide 1A

In a 250 mL flask, PPh$_3$*HBr (25 g, 72.9 mmol) was added to acetonitrile (73.5 mL) and heated to 80° C. under argon (Ar) for a few minutes to form a white slurry. To this slurry, furfuryl alcohol (7.15 g, 72.9 mmol) was added. The mixture was stirred for 40 minutes at 80° C. Then it was cooled to room temperature (RT) and the solid was filtered off and rinsed with cold acetonitrile. The product was then dried in a vacuum oven in the presence of P$_2$O$_5$. Product 1A was a white granular solid.

Yield 23.45 g (76%). $^1$H-NMR (DMSO-d$_6$, ppm): δ=7.99-7.78 (m; 3H), 7.75-7.66 (m; 12H), 7.60 (m; 1H), 6.41 (m; 1H), 6.17 (t; 1H), 5.50 (d; $J_{P-H}$=15 Hz; 2H). $^{13}$C-NMR (DMSO-d$_6$) δ=144.6, 142.5 (d; J=10.8 Hz), 135.7, 134.4 (d; J=9.9 Hz), 130.6 (d; J=9.9 Hz), 118.9, 118.1, 112.7 (d; J=7.7 Hz), 111.9.

Synthesis of N-ethyl-N-(4-formyl phenyl)-5-aminopentyl alcohol 1B was accomplished by the route described in patent application US 2005/253120.

[II]. Synthesis of 5-(N-ethyl-N-(4-((E)-2-(furan-2-yl)vinyl)phenyl)amino)pentan-1-ol 2

In a 200 mL flask, 1A (18.47 g, 43.6 mmol) and N-ethyl-N-(4-formyl phenyl)-5-aminopentyl alcohol 1B (10.27 g, 43.6 mmol) were dissolved in anhydrous ethanol (115 mL) under Ar at RT. In a separate flask, sodium ethoxide (2.97 g, 43.6 mmol) was dissolved in anhydrous ethanol (51 mL). The ethanolic sodium ethoxide solution was added by addition funnel to the solution containing the starting reagents. The reaction mixture was then heated to 85° C. and stirred for 4 hours. The reaction mixture was evaporated and the product was extracted into dichloromethane against water. The crude product was purified on silica gel using 1:1 hexane:ethyl acetate. Product 2 was a red viscous liquid.

Yield 11.9 g (91%). $^1$H-NMR (CDCl$_3$, ppm): The product existed as a mixture of cis- and trans-isomers, which were inseparable. $^1$H-NMR (CDCl$_3$, ppm) δ=7.41 (d; J=8.8, 0.65H), 7.36 (d; J=1.8 Hz, 0.9H), 7.33 (d; J=8.8 Hz, 1.6H), 6.95 (d; J=16.1 Hz, 0.71H), 6.68 (d; J=16.1 Hz, 0.82H), 6.63 (d; J=8.8 Hz, 1.6H), 6.59 (s; 0.5H), 6.42-6.58 (m; 1.57H), 6.23 (d; J=3.3 Hz, 0.71H), 6.15 (d; J=12.8 Hz, 0.29), 3.64 (t; 2H), 3.37 (q; 2H), 3.28 (t; 2H), 1.61 (m; 4H), 1.41 (m; 2H), 1.16 (t; 3H). $^{13}$C-NMR (CDCl$_3$, ppm): δ=154.3, 153.0, 147.6, 147.3, 141.3, 141.0, 130.3, 127.7, 127.6, 124.4, 124.1, 113.9, 112.1-111.0, 109.7, 106.5, 62.8, 50.4, 45.1, 32.6, 27.5, 23.4, 12.4.

[III]. Synthesis of 2-[2-[4-[N-ethyl-N-[5-[(t-butyldimethyl) silyloxy]pentyl]amino]phenyl]ethenyl]furan 3

In a 200 mL flask, 2 (8.17 g, 27.3 mmol) and tert-butyldimethylsilyl chloride (6.17 g, 41.0 mmol) were dissolved in dichloromethane. Then imidazole (2.79 g, 41.0 mmol) was added, and the reaction mixture was stirred under Ar for 20 minutes. The reaction mixture was cooled briefly in dry ice container, and then the solid (imidazole hydrochloride) was filtered off. The filtrate was evaporated on silica gel and filtered by flash chromatography using a gradient 5:1→3:1 hexane:ethyl acetate. Product 3 was a red oil.

Yield 11.01 g (97%). The product existed as a mixture of cis- and trans-isomers, which were inseparable. $^1$H-NMR (CDCl$_3$, ppm) δ=7.40 (d; J=8.7 Hz, 0.7H), 7.35-7.32 (m; 2.55H), 6.96 (d; J=16.1 Hz, 0.74H), 6.68 (d; J=16.1 Hz, 0.85H), 6.66-6.59 (m; 2.07H), 6.40-6.32 (m; 1.68H), 6.23 (d; J=3.3 Hz, 0.7H), 6.15 (d; J=12.8 Hz, 0.28H), 3.62 (t; 2H), 3.38 (q; 2H), 3.27 (t; 2H), 1.65-1.50 (m; 4H), 1.38 (m; 2H), 1.16 (t; 3H), 0.91 (s; 9H), 0.06 (s; 6H). $^{13}$C-NMR (CDCl$_3$, ppm): δ=154.3, 153.1, 147.6, 147.3, 141.2, 141.0, 130.3, 128.7, 127.8, 124.3, 124.0, 114.0, 112.0, 111.7, 111.6, 111.2, 111.0, 108.9, 106.5, 63.1, 50.5, 45.1, 32.8, 27.5, 26.1, 25.8, 23.5, 18.5, 12.5.

[IV]. Synthesis of 2-[2-[4-[N-ethyl-N-[5-[(t-butyldimethyl) silyloxy]pentyl]amino]phenyl]ethenyl]-5-furaldehyde 4

In a 100 mL flask, 3 (10.81 g, 26.1 mmol) was dissolved in tetrahydrofuran (10 vol., 108 mL, freshly distilled from sodium and benzophenone) under Ar and cooled to −78° C. 2.5 M n-butyl lithium in tetrahydrofuran (21.0 mL, 52.5 mmol) was added dropwise, and then the reaction mixture was warmed to 0° C. Dry dimethylformamide (9.43 mL, 123 mmol, freshly distilled from CaH$_2$) was added drop-wise. The solution was allowed to warm to RT and stirred for 1 hour. The reaction mixture was then poured into a separatory funnel containing a mixture of ether and water. A small amount of brine was added to assist separation. The organic layer was dried with MgSO$_4$ and evaporated. The product was purified over silica gel, first with toluene as the eluent, then a second purification was run with 9:1 hexane:ethyl acetate. It is important to remove as much of the cis isomer as possible at this point. Product 4 was recovered as a red viscous liquid (cis/trans: 2.6:7.2).

Yield 10.81 g (94%). $^1$H-NMR (CDCl$_3$, ppm) trans: δ=9.51 (s; 1H), 7.36 (d; J=8.8 Hz; 2H), 7.31 (d; J=16.1 Hz; 1H), 7.22 (d; J=3.7 Hz; 1H), 6.67 (d; J=16.1 Hz; 1H), 6.62 (d; J=8.8 Hz; 2H), 6.40 (d; J=3.7 Hz; 1H), 3.61 (t; 2H), 3.40 (q; 2H), 3.38 (t; 2H), 1.58 (m; 4H), 1.39 (m; 2H), 1.17 (t; 3H). $^{13}$C-NMR (CDCl$_3$, ppm): δ=176.3, 160.5, 151.2, 148.6, 134.3, 128.8, 122.9, 111.5, 109.7, 108.8, 63.1, 50.5, 45.1, 31.7, 27.4, 26.1, 22.7, 18.5, 12.4, −5.7.

cis: δ=9.54 (s; 1H), 7.42 (d; J=8.8 Hz; 2H), 7.17 (d; J=3.7 Hz; 1H), 6.62 (d; J=12.5 Hz; 1H), 6.60 (d; J=8.8 Hz; 2H), 6.57 (d; J=3.7 Hz; 1H), 6.18 (d; J=12.5 Hz; 1H), 3.61 (t; 2H), 3.40 (q; 2H), 3.38 (t; 2H), 1.58 (m; 4H), 1.39 (m; 2H), 1.17 (t; 3H). $^{13}$C-NMR (CDCl$_3$, ppm): δ=176.9, 158.9, 150.9, 148.2, 135.2, 130.7, 122.8, 112.4, 111.2, 111.1, 63.1, 50.5, 45.1, 31.7, 27.4, 26.1, 22.7, 18.5, 12.4, −5.7.

[V]. Synthesis of 2-[2-[4-[N-ethyl-N-(5-hydroxylpentyl)amino]phenyl]ethenyl]-5-furaldehyde 5

In a 100 mL flask, 4 (10.81 g, 24.5 mmol) was dissolved in dry tetrahydrofuran (10 vol., 108 mL) at RT. 1 M tetrabutylammonium fluoride in tetrahydrofuran (27.0 mL, 27.0 mmol) was added by syringe and the reaction mixture was stirred for 45 minutes. The reaction mixture was poured into a separatory funnel containing ether and water. The organic phase was evaporated, then dissolved in methanol and poured into a separatory funnel containing hexane. The methanol phase was rinsed several times with hexane to remove any silicon compounds. The methanol layer was evaporated, then taken up once again in ether and rinsed once with water to remove any methanol, then once with brine to pre-dry. The organic layer was dried with Na$_2$SO$_4$ and product 5 was collected as a red viscous liquid and used in the next step as is (cis/trans: 2.6:7.2).

Yield 7.63 g (95%). $^1$H-NMR (CDCl$_3$, ppm) trans: δ=9.45 (s; 1H), 7.43 (d; J=8.8 Hz; 2H), 7.30 (d; J=16.1 Hz; 1H), 7.23 (d; J=3.7 Hz; 1H), 6.68 (d; J=16.11 Hz; 1H), 6.62 (d; J=8.8 Hz; 2H), 6.41 (d; J=3.6 Hz; 1H), 3.61 (t; 2H), 3.34 (q; 2H), 3.25 (t; 2H), 2.14 (s; 1H), 1.59 (m; 4H), 1.38 (m; 2H), 1.15 (t; 3H).

cis: δ=9.47 (s, 1H), 7.37 (d; J=8.8 Hz; 2H), 7.18 (d; J=3.7 Hz; 1H), 6.62 (d; J=12.5 Hz; 1H), 6.61 (d; J=8.8 Hz; 2H), 6.56 (d; J=3.7 Hz; 1H), 6.17 (d; J=12.5 H), 3.61 (t; 2H), 3.34 (q; 2H), 3.25 (t; 2H), 2.14 (s; 1H), 1.59 (m; 4H), 1.38 (m; 2H), 1.15 (t; 3H).

[VI]. Synthesis of 2-[2-[4-[N-ethyl-N-[5-[4-iodobenzoyl]pentyl]amino]phenyl]ethenyl]-5-furaldehyde 6A In a 200 mL flask, 5 (7.63 g, 23.3 mmol), DCC (4.81 g, 23.3 mmol), 4-iodobenzoic acid (5.79 g, 23.3 mmol), and dimethylamino pyridine (0.85 g, 7.0 mmol) were dissolved in tetrahydrofuran (20 vol., 150 mL, freshly distilled from sodium and benzophenone) at room temperature and stirred overnight under Ar. The reaction mixture was filtered and the filtrate was added to a separatory funnel containing ether and water. The ether layer was rinsed several times with water, followed by dilute K$_2$CO$_3$, and then with dilute aqueous brine. The organic layer was evaporated onto silica gel and subsequently purified on silica gel with 3:1 hexane: ethyl acetate. Product 6A was a red viscous liquid (100% trans).

Yield=12.92 g (99.5%). $^1$H-NMR (CDCl$_3$, ppm): δ=9.50 (s; 1H), 7.77 (d; J=8.8 Hz; 2H), 7.73 (d; J=8.8 Hz; 2H), 7.35 (d; J=8.8 Hz; 2H), 7.30 (d; J=16.1 Hz; 1H), 7.21 (d; J=3.7 Hz, 1H), 6.68 (d; J=16.1 Hz; 1H), 6.61 (d; J=8.8 Hz; 2H), 6.41 (d; J=3.7 Hz; 1H), 4.31 (t; 2H), 3.37 (q; 2H), 3.29 (t; 2H), 1.80 (m; 2H), 1.66 (m; 2H), 1.47 (m; 2H), 1.14 (t; 3H). $^{13}$C-NMR (CDCl$_3$, ppm): δ=176.3, 166.2, 160.4, 151.2, 148.5, 137.8, 134.2, 131.1, 128.9, 128.8, 123.1, 111.6, 109.9, 108.9, 100.7, 65.1, 50.3, 45.2, 28.7, 27.4, 23.7, 12.5. MS: m/z=558 (M$^+$).

Synthesis of trifluorovinylzinc bromide 6B was accomplished by the procedure described in patent application US 2005/253120.

[VII]. Synthesis of 2-[2-[4-[N-ethyl-N-[5-[4-trifluorovinylbenzoyl]pentyl]amino]phenyl]ethenyl]-5-furaldehyde 7A In a 200 mL flask, 6A (12.92 g, 23.18 mmol) and tetrakis-triphenylphosphine palladium (700 mg, 0.603 mmol) were added to 1 M trifluorovinylzinc bromide 6B in dimethylformamide (92.7 mL, 46.4 mmol) and stirred at 100° C. under Ar for 3 hours. The reaction mixture was cooled to RT and extracted with ethyl ether and brine. The organic layer was dried with MgSO$_4$ and evaporated onto silica gel. The adsorbed product was purified on silica gel with 3:1 hexane:ethyl acetate. Product 7A was a dark rust-colored viscous liquid.

Yield=10.2 g (86%). $^1$H-NMR (CDCl$_3$, ppm): δ=9.50 (s; 1H), 8.07 (d; J=8.8 Hz; 2H), 7.53 (d; J=8.8 Hz; 2H), 7.35 (d; J=8.8 Hz; 2H), 7.30 (d; J=16.1 Hz; 1H), 7.22 (d; J=3.7 Hz, 1H), 6.67 (d; J=16.1 Hz; 1H), 6.62 (d; J=8.8 Hz; 2H), 6.40 (d; J=3.7 Hz; 1H), 4.35 (t; 2H), 3.39 (q; 2H), 3.32 (t; 2H), 1.83 (m; 2H), 1.67 (m; 2H), 1.50 (m; 2H), 1.16 (t; 3H). $^{13}$C-NMR (CDCl$_3$, ppm): δ=176.3, 165.9, 160.4, 154.2 (td; J=293.6, 50.0 Hz), 151.2, 148.5, 134.1, 131.8 (dd; J=21.5, 6.9 Hz), 130.4, 129.9, 128.8, 124.1, 123.1, 111.6, 109.8, 108.9, 65.2, 50.3, 45.2, 28.7, 27.4, 23.7, 12.4.

Synthesis of and 2-dicyanomethylene-3-cyano-4,5,5-trimethyl-(2H,5H)-furan 7B was accomplished by the synthetic route described in Polymer 44 (2003) 3785-3794.

[VIII]. Synthesis of Chromophore JT-1

In a 200 mL flask, 7A (4.34 g, 8.48 mmol) and 2-dicyanomethylene-3-cyano-4,5,5-trimethyl-(2H,5H)-furan 7B (1.69 g, 8.48 mmol) were dissolved in chloroform (10 vol., 43 mL). After the starting material was completely dissolved, piperidine (335 μL, 3.39 mmol) was added. This mixture was stirred for 1.5 hours at RT, and then evaporated onto silica gel. The product was then purified on silica gel with 3:1→1:1 hexane:ethyl acetate, followed by a second column purification using 7:1→5:1 toluene: ethyl acetate to yield a dark reddish-brown solid JT-1 (100% trans).

Yield=4.45 g (76%). $^1$H-NMR (CDCl$_3$, ppm): δ=8.06 (d; J=8.8 Hz; 2H), 7.53 (d; J=8.8 Hz; 2H), 7.40 (d; J=8.8 Hz; 2H), 7.38 (d; J=15.7 Hz; 1H), 7.27 (d; J=16.1 Hz; 1H), 7.02 (d; J=4.0 Hz; 1H), 6.72 (d; J=15.7 Hz; 1H), 6.68 (d; J=16.1 Hz; 1H), 6.64 (d; J=8.8 Hz; 2H), 6.53 (d; J=4.0 Hz; 1H), 4.34 (t; 2H), 3.41 (q; 2H), 3.34 (t; 2H), 1.83 (m; 2H), 1.73 (s; 6H), 1.72 (m; 2H), 1.50 (m; 2H), 1.24 (t; 3H). $^{13}$C-NMR (CDCl$_3$, ppm): δ=176.1, 172.9, 165.9, 162.2, 154.2 (td; J=293.6, 50.0 Hz), 150.2, 149.1, 135.2, 131.8 (dd; J=21.5, 6.9 Hz), 130.5, 130.0, 129.4, 126.0, 124.1, 112.3, 111.7, 109.5, 109.4, 97.0, 94.9, 65.1, 55.2, 50.3, 45.2, 28.7, 27.4, 26.6, 23.7, 12.5. MS: m/z=693 (M$^+$).

Example 1

An EO modulator-composition sample was prepared. The components of the composition were as follows:

| | |
|---|---|
| (i) 6F-DA/TF-BAPF type polyimide (described in Production Example 1): | 80 wt % |
| (ii) Prepared chromophore powder of TF-DR-1 (Production Example 3): | 20 wt % |

Preparation of Non-Linear Optical Testing Samples

The procedure of testing film sample fabrication is described as follows:
i) The matrix TF-PIM and the chromophore were mixed by the described.
ii) DMAc-THF(1/1) solvents were added to make 10 wt/vol % solution.
iii) The solution was stirred for a certain time period (usually for 4-6 hours at least). Then, filter it by using 0.2 μm PTFE filter disk.
iv) Spin-coating: 430 rpm for 9 sec on substrates (glass, quartz, or ITO coated glass).
v) Removing solvent: 70° C. for 2 minutes and under vacuum and dry environment. Post-treatment: 50° C. for 16 hours under vacuum environment.

By using the above method, testing samples on a substrate of glass or quartz were prepared. The film thickness of the samples were determined by surface profile measuring machine (manufactured by Dektak Co. LTD). Thickness of the sample was 2.2 μm.

Measurement 1

The material characterizations include: refractive index measurement, loss measurement, poling processing, EO coefficient ($r_{33}$) measurement and processing compatibility, etc.

Refractive Index Measurements

The waveguide sample of the prepared thin films (2.2 μm thickness on glass substrate) supported two modes (both TE and TM) at 1.31 μm, respectively. The results were 1.565 (TE mode) and 1.558 (TM mode).

Loss Measurements

Figure 2:
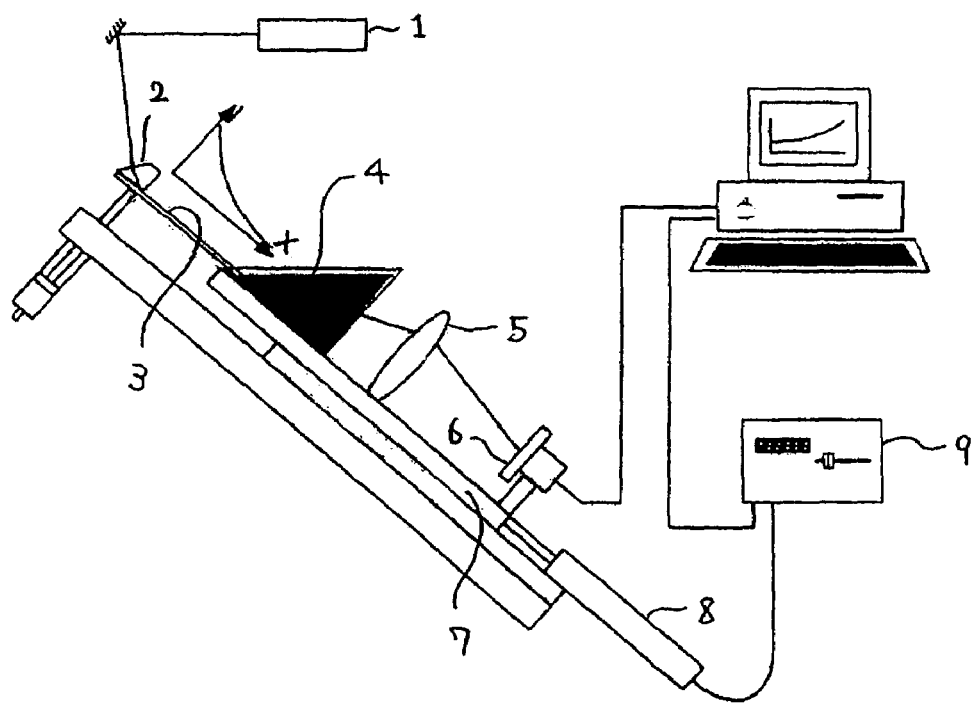
FIG. 2 is a view showing Experimental Setup for waveguide loss measurement.

Insertion losses in polymers including absorption and scattering losses are due to material properties, namely interband electronic absorption of the chromophore and C—H vibration absorption of chromophore and polymer host. The scattering loss is mainly attributed to dust particles and microdomains introduced during the processing (spin coating, poling, photolithographic processing, and etc.). There have been several techniques to measure insertion loss in polymer materials. The nondestructive and immersion method developed by Teng is relatively convenient and precision technique commonly used for loss measurements of polymer waveguide devices, and the setup is shown in FIG. 2. Experimental Setup for waveguide loss measurement as shown in FIG. 2 is constituted of laser 1, prism 2, waveguide 3, glass container with index matching liquid 4, lens 5, detector 6, translation stage 7, actuator 8, and actuator controller 9. A setup for loss measurement together with computer-controlling software is schematically shown in Figure. Intensity of laser signal was measured by changing distance of the waveguide. Based on slope rate of the data, a propagation loss can be calculated.

The propagation loss measurement result of the Example 1 sample was ~0.06 dB/cm at 1.31 μm under TM mode using prism coupling technique.

EO Coefficient $r_{33}$ Measurements

By using the grating method, $r_{33}$ value of the sample was measured. As a result, the Example 1 sample case was 4.4 pm/V.

Example 2

An EO modulator-composition sample was prepared. The components of the composition were as follows:

| | |
|---|---|
| (i) 6F-DA / TF-BAPF type polyimide (described in Production Example 1): | 80 wt % |
| (ii) Prepared chromophore powder of CLD-75 (described in the below figure) | 20 wt % |

(CLD-75)

EO Coefficient $r_{33}$ Measurements

By using the same grating method, $r_{33}$ value of the sample was measured. As a result, the Example 2 sample case was 70 pm/V.

Example 3

An EO modulator composition sample was prepared. The components of the composition were as follows:

| | |
|---|---|
| (i) Four-component (TF-BAPF/APB/6F-DA/ODA) type polyimide (described in Production Example 2): | 80 wt % |
| (ii) Prepared chromophore powder of TF-DR-1 (Production Example 3) | 20 wt % |

Example 4

An EO modulator composition sample was prepared. The components of the composition were as follows:

| | |
|---|---|
| (i) Four-component (TF-BAPF/APB/6F-DA/ODA) type polyimide (described in Production Example 2): | 80 wt % |
| (ii) Prepared chromophore of TF-FTC (Production Example 4) | 20 wt % |

Example 5

An EO modulator composition sample was prepared. The components of the composition were as follows:

| | |
|---|---|
| (i) Four-component (TF-BAPF/APB/6F-DA/ODA) type polyimide (described in Production Example 2): | 80 wt % |
| (ii) Prepared chromophore of DR-1 (supplied from Aldrich) | 20 wt % |

Example 6

An EO modulator composition sample was prepared. The components of the composition were as follows:

| | |
|---|---|
| (i) Four-component (TF-BAPF / APB/ 6F-DA / ODA) type polyimide (described in Production Example 2): | 80 wt % |
| (ii) Prepared chromophore powder of JT-1 (Production Example 5) | 20 wt % |

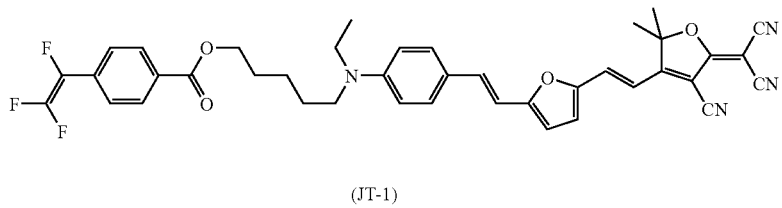

(JT-1)

EO Coefficient r33 Measurements

By using the Teng and Man method, r33 value of the sample was measured. As a result, the Example 6 sample case was 280 pm/V.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A non-linear optical device material composition comprising a polyimide and a non-linear optical chromophore, wherein the polyimide comprises a unit represented by the formula (ii):

Formula (ii)

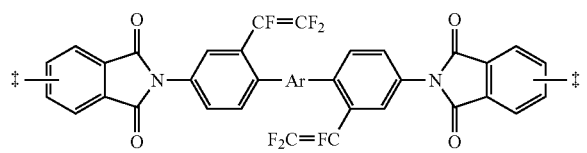

wherein Ar is a bivalent aromatic group and the symbol "‡" in the chemical structure represents an atom of attachment to another chemical group.

2. The composition of claim 1, wherein the non-linear optical chromophore comprises a unit represented by the formula (i):

Formula (i)

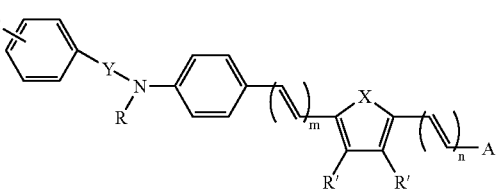

wherein the symbol "‡" in the chemical structure represents an atom of attachment to another chemical group.

3. The composition of claim 2, wherein the non-linear optical chromophore comprises a compound represented by the formula (x):

Formula (x)

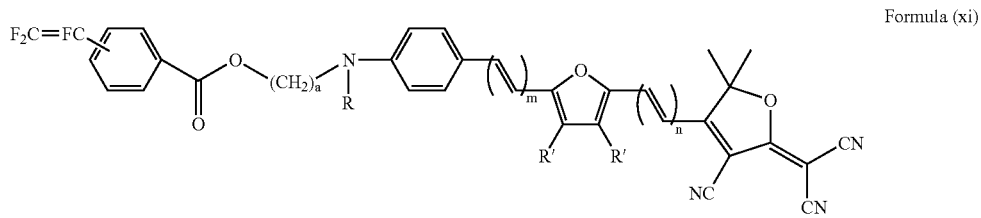

wherein X is oxygen or sulfur; Y is a bivalent group; A is an acceptor; R and R' are each independently selected from the group consisting of a hydrogen atom, a linear alkyl group with up to 10 carbons, and a branched alkyl group with up to 10 atoms; m and n are each independently an integer of from 1 to 5.

4. The composition of claim 2, wherein the non-linear optical chromophore is mixed in said polyimide in a concentration of about up to 50 wt %.

5. The composition of claim 3, wherein the non-linear optical chromophore comprises a compound represented by the formula (xi):

Formula (xi)

wherein R and R' are each independently selected from the group consisting of a hydrogen atom, a linear alkyl group with up to 10 carbons, and a branched alkyl group with up to 10 atoms; a is an integer of from 1 to 8; m and n are each independently an integer of from 1 to 5.

6. The composition of claim 3, wherein the non-linear optical chromophore is mixed in said polyimide in a concentration of about up to 50 wt %.

7. The composition of claim 5, wherein the non-linear optical chromophore comprises a compound represented by the following structure:

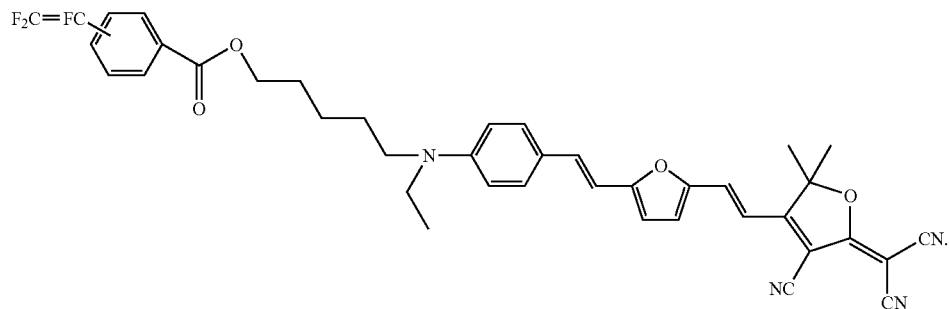

8. The composition of claim 5, wherein the non-linear optical chromophore is mixed in said polyimide in a concentration of about up to 50 wt %.

9. The composition of claim 7, wherein the non-linear optical chromophore is mixed in said polyimide in a concentration of about up to 50 wt %.

10. The composition of claim 1, wherein Ar contains —$C(CF_3)_2$— moiety in the group.

11. The composition of claim 10, wherein the non-linear optical chromophore comprises a unit represented by the formula (i):
Formula (i)

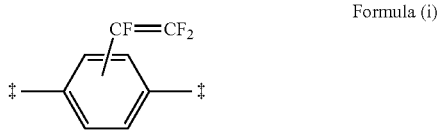

Formula (i)

wherein the symbol "‡" in the chemical structure represents an atom of attachment to another chemical group.

12. The composition of claim 10, wherein the non-linear optical chromophore is mixed in said polyimide in a concentration of about up to 50 wt %.

13. The composition of claim 11, wherein the non-linear optical chromophore is mixed in said polyimide in a concentration of about up to 50 wt %.

14. The composition of claim 1, wherein the non-linear optical chromophore is mixed in said polyimide in a concentration of about up to 50 wt %.

* * * * *

UNITED STATES PATENT AND TRADEMARK OFFICE
CERTIFICATE OF CORRECTION

PATENT NO.       : 7,250,121 B2                                       Page 1 of 1
APPLICATION NO.  : 11/314927
DATED            : July 31, 2007
INVENTOR(S)      : Yamamoto et al.

It is certified that error appears in the above-identified patent and that said Letters Patent is hereby corrected as shown below:

On the title page, line 6, item 56 underneath "Other Publications", please delete "Containg Polymide" and insert therefore, --Containing Polyimide--.

On the title page, line 7, item 56 underneath "Other Publications", please delete "124" and insert therefore, --125--.

On the title page, line 32, item 56 underneath "Other Publications", please delete "578" and insert therefore, --576--.

Column 35-36, in Scheme 1, above "furfuryl alcohol", insert therefore

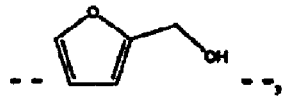

Column 39, line 48, please delete "(d; J=12.5 H)" and insert therefore --(d; J=12.5; 1H)--, Column 44, approximately line 43, in Claim 3, please delete "Rand" and insert therefore --R and--.

Signed and Sealed this

Fifth Day of February, 2008

JON W. DUDAS
*Director of the United States Patent and Trademark Office*